US011748823B2

(12) United States Patent
Cameron et al.

(10) Patent No.: US 11,748,823 B2
(45) Date of Patent: *Sep. 5, 2023

(54) GRAPHICAL USER INTERFACES FOR INITIATING AND INTEGRATING DIGITAL-MEDIA-LITERACY EVALUATIONS INTO A SOCIAL NETWORKING PLATFORM

(71) Applicant: SoLit 101, LLC, Sandy, UT (US)

(72) Inventors: Jordan Kevin Cameron, Sandy, UT (US); Emily Vranes Cameron, Sandy, UT (US); Bryceson Vranes Ringwood, Sandy, UT (US); Curtis Lee Wichern, Sandy, UT (US); Franklin Alan Fullmer, Cedar Hills, UT (US)

(73) Assignee: SoLit 101, LLC, Sandy, UT (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/188,184

(22) Filed: Mar. 1, 2021

(65) Prior Publication Data

US 2022/0277664 A1 Sep. 1, 2022

(51) Int. Cl.
*G06Q 50/00* (2012.01)
*H04L 51/02* (2022.01)

(52) U.S. Cl.
CPC ............. *G06Q 50/01* (2013.01); *H04L 51/02* (2013.01)

(58) Field of Classification Search
None
See application file for complete search history.

(56) References Cited

U.S. PATENT DOCUMENTS

| 10,768,770 | B2* | 9/2020 | Pearl | G06F 3/048 |
| 11,005,843 | B1* | 5/2021 | Sagduyu | H04L 51/046 |
| 11,157,877 | B1* | 10/2021 | Bue | G06Q 10/1053 |
| 11,343,208 | B1* | 5/2022 | Shetty | H04L 51/02 |
| 11,423,491 | B1* | 8/2022 | O'Connor | G06Q 20/0855 |
| 2013/0103491 | A1* | 4/2013 | Silverstein | G06Q 30/02 705/14.7 |
| 2013/0152211 | A1* | 6/2013 | Wu | G06F 21/10 709/204 |
| 2013/0268589 | A1* | 10/2013 | Torgersrud | G06Q 50/01 709/204 |

(Continued)

*Primary Examiner* — Florian M Zeender
*Assistant Examiner* — Karma A El-Chanti
(74) *Attorney, Agent, or Firm* — Keller Preece PLLC

(57) ABSTRACT

This disclosure describes methods, non-transitory computer readable storage media, and systems that generate and present tools on an administrator user interface that can initiate a user-interaction evaluation of users' digital media proficiency and can show a snapshot of user interactions with digital content from the evaluation. For instance, the disclosed systems provide, within a graphical user interface, an option to initiate a user-interaction evaluation. Based on a selection of the option, the disclosed systems generate digital content within the social networking platform as part of the evaluation. The disclosed systems subsequently display information for the evaluation and tracking information for user interactions within the graphical user interface. In one or more portions of the graphical user interface, the disclosed systems display an evaluation dashboard including user-interaction evaluation information. In other portions of the graphical user interface, the disclosed systems display actions from user accounts interacting with the digital content.

20 Claims, 13 Drawing Sheets

(56) References Cited

U.S. PATENT DOCUMENTS

| | | | | |
|---|---|---|---|---|
| 2013/0332879 A1* | 12/2013 | Lewis | G06F 3/04842 | 715/781 |
| 2014/0136614 A1* | 5/2014 | Satalkar | G06Q 10/10 | 709/204 |
| 2014/0173660 A1* | 6/2014 | Correa | H04N 21/8173 | 725/42 |
| 2014/0199663 A1* | 7/2014 | Sadeh-Koniecpol | H04L 63/1408 | 434/118 |
| 2014/0280551 A1* | 9/2014 | Byrd Vallieres de St. Real | H04L 67/535 | 709/204 |
| 2015/0127418 A1* | 5/2015 | Piepgrass | G06Q 50/01 | 705/7.29 |
| 2015/0229664 A1* | 8/2015 | Hawthorn | H04L 63/1433 | 726/25 |
| 2015/0356261 A1* | 12/2015 | Brust | G16Z 99/00 | 705/2 |
| 2016/0018972 A1* | 1/2016 | Merkin | G06Q 10/0633 | 715/762 |
| 2016/0300253 A1* | 10/2016 | Kaufman | G06Q 50/01 | |
| 2016/0371471 A1* | 12/2016 | Patton | H04L 63/102 | |
| 2017/0154317 A1* | 6/2017 | Bruce | H04L 67/535 | |
| 2018/0341716 A1* | 11/2018 | Iyer | G06F 16/437 | |
| 2019/0245917 A1* | 8/2019 | Mendiola | G06Q 50/01 | |
| 2019/0273707 A1* | 9/2019 | Deac | H04L 51/10 | |
| 2020/0065857 A1* | 2/2020 | Lagi | G06F 16/9538 | |
| 2020/0110895 A1* | 4/2020 | Chakra | G06F 21/6245 | |
| 2020/0143405 A1* | 5/2020 | Tucker | G06F 21/10 | |
| 2020/0342032 A1* | 10/2020 | Subramaniam | G10L 15/063 | |
| 2021/0004770 A1* | 1/2021 | Bansal | G06Q 10/1095 | |
| 2021/0029171 A1* | 1/2021 | Barday | H04L 63/0414 | |
| 2021/0082309 A1* | 3/2021 | Rosenberg | G09B 5/02 | |
| 2021/0367915 A1* | 11/2021 | Singhania | G06F 16/951 | |

* cited by examiner

GRAPHICAL USER INTERFACES FOR INITIATING AND INTEGRATING DIGITAL-MEDIA-LITERACY EVALUATIONS INTO A SOCIAL NETWORKING PLATFORM

BACKGROUND

As network communications and computing device capabilities have improved, computing systems have implemented many different types of digital media services. For example, some online systems include social networking platforms for users to interact with each other in an open digital format. In such an open environment with relatively few system limitations on users' activities, users often independently select or prohibit the types of network communications they use while social networking. Such social networking platforms allow users to communicate with each other by sending messages, forming groups, sharing digital media, and interacting with digital content generated by other users.

Because social networking platforms foster many user exchanges and different digital mediums for user interactions, such platforms often capture or otherwise record a significant amount of personal data input by users within the online system(s) and/or by the users of the social networking platforms. To illustrate, many social networking platforms provide various digital exchange mediums through which users provide contact information, photos, or any number of personal details. For instance, social networking platforms often include user profiles and posting functions through which (i) users share sensitive content with other users or with the social networking platform or (ii) users directly interact with each other. Accordingly, existing social networking platforms provide various digital mediums or exchanges through which users can disclose or otherwise compromise the security of personal data or also exhibit bully-like, risky, or other behavior that can be digitally stored, recovered, or used to exploit the unwitting or uncareful user.

In addition to facilitating interactions and information sharing, existing online systems provide limited functionality for observing or tracking online interactions by users. For example, some existing online systems allow an observer to track user interactions for bullying, catfishing, sharing personal information, or other risky online behavior. In some cases, users can follow or initiate a friendship relationship within a social networking platform to observe or track such behavior. But existing online systems require the observer to individually and manually review posts or messages by other users. In addition to tracking, users within an online environment sometimes create alternative or fake accounts to capture personal information from other users, spread malware to other users' devices, or post bullying content. Because such existing online systems are limited in functionality, users who exploit alternative accounts or track behavior often must navigate among multiple graphical user interfaces, logging in and out of multiple accounts, etc. in a cumbersome and laborious process.

Some existing online systems that implement social networking platforms further include security protocols that prevent access to user data and prevent certain actions within the platforms by external servers, software programs, or other entities. For example, these existing online systems prevent bots (e.g., software programs that perform certain tasks) or other external entities from accessing user data or from performing specific social networking actions to protect user data. Thus, the existing online systems attempt to prevent malicious, unwanted access to user data and predatory or security-compromising functions within the social networking platform.

By preventing or limiting access by external entities, however, the existing online systems also prevent third-party systems from providing various services to users of the social networking platforms. For example, some third-party systems provide user security analysis or similar services that analyze user data and user behaviors to assess security or privacy risks to the users. Limiting access to user data by external entities, however, limits the accuracy of the third-party systems by restricting the third-party systems to analyzing data based only on a temporary snapshot of available data at a particular time. Additionally, some existing online systems require users to use services or functions provided within the existing online systems. Thus, the existing online systems limit the availability of resources to which users have access to improve the security of their data or for performing other functions.

SUMMARY

This disclosure describes one or more embodiments of systems, methods, and non-transitory computer readable storage media that provide benefits and/or solve the foregoing problems. For instance, the disclosed systems generate and present tools on an administrator user interface that can initiate a user-interaction evaluation of users' digital media proficiency and show a snapshot of user interactions with digital content from the initiated evaluation. The disclosed systems thus provide an efficient graphical user interface for implementing a user-interaction evaluation and depicting real-time (or near-real-time) user interactions with targeted digital content within a social networking platform.

Within a graphical user interface of an administrator client device, for instance, the disclosed system can provide an option to initiate a user-interaction evaluation for digital media proficiency in a social networking platform. When the option is selected by an administrator, the disclosed system generates digital content (e.g., social networking posts) within the social networking platform as part of the user-interaction evaluation. The digital content may include digital content generated organically (by other users or administrators), by an artificial intelligence service or other software algorithm, or by pulling previously defined content from a data storage service, such as a database, flat file, etc. The disclosed system can subsequently display parts of the user-interaction evaluation and tracking information for user interactions within the graphical user interface. In one or more portions of the graphical user interface, the disclosed system displays an evaluation dashboard including digital instruction material or other user-interaction-evaluation information. In another portion or portions of the graphical user interface or in another user interface, the disclosed system displays actions from the user accounts interacting with the digital content.

BRIEF DESCRIPTION OF THE DRAWINGS

Various embodiments will be described and explained with additional specificity and detail through the use of the accompanying drawings in which.

DETAILED DESCRIPTION

Figure 1:
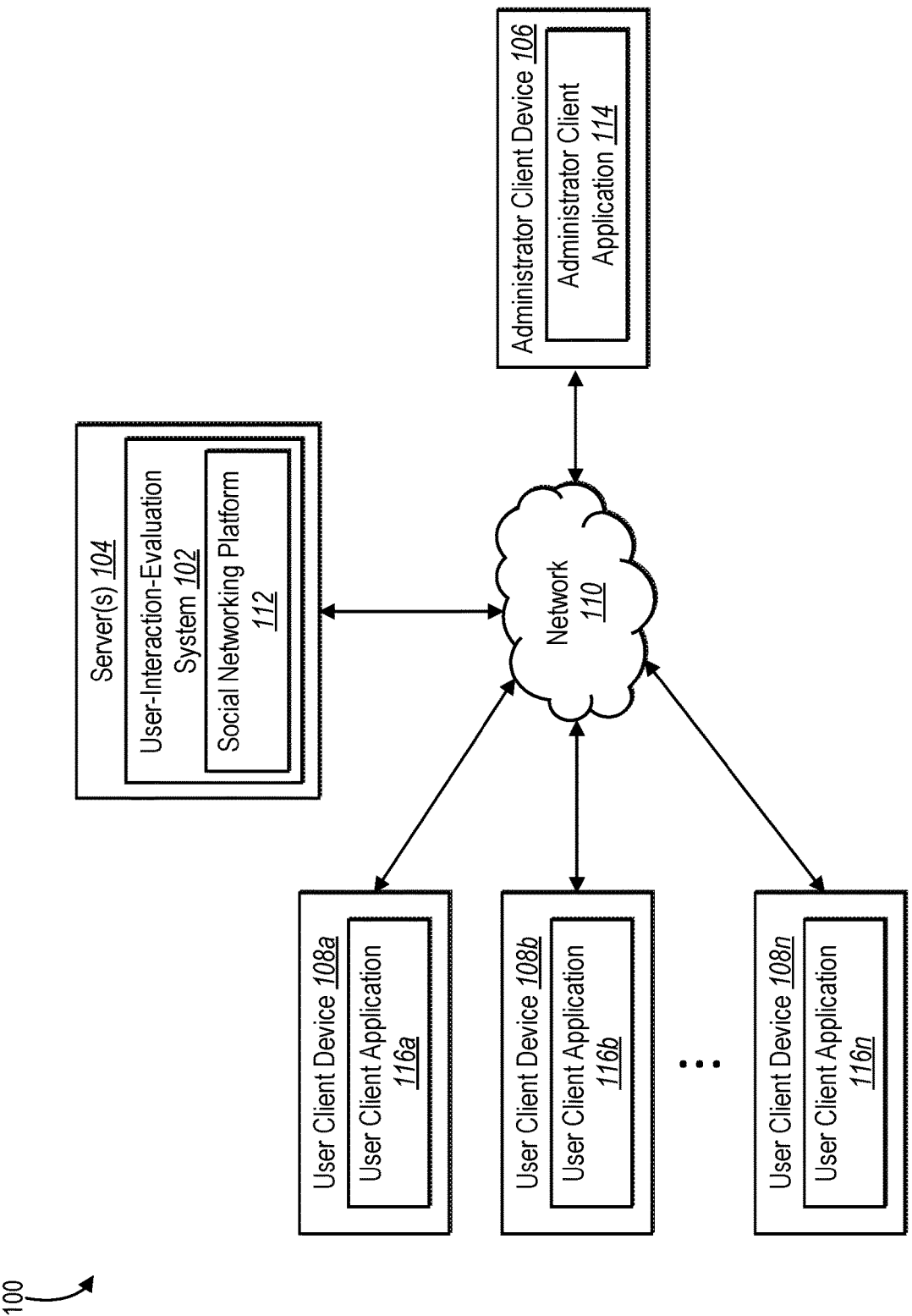
FIG. 1 illustrates a schematic diagram of a system environment in which a user-interaction-evaluation system operates in accordance with one or more implementations.

This disclosure describes one or more embodiments of a user-interaction-evaluation system that generates and presents an efficient administrator graphical user interface in connection with launching a user-interaction evaluation with targeted digital content to evaluate user digital media literacy with social networking. Based on a request to initiate a user-interaction evaluation, for example, the user-interaction-evaluation system generates digital content for display within the social networking platform as part of the user-interaction evaluation. The user-interaction-evaluation system then displays an evaluation dashboard within the administrator graphical user interface with digital instruction material or other information associated with the user-interaction evaluation. Furthermore, the user-interaction-evaluation system detects actions by user accounts interacting with the digital content within the social networking platform and displays the actions within the same or another administrator graphical user interface.

As mentioned, in some embodiments, the user-interaction-evaluation system presents an administrator graphical user interface including an option to initiate a user-interaction evaluation for digital media proficiency in a social networking platform. For example, the user-interaction-evaluation system can provide, to an administrator client device, a plurality of available content or interaction lessons (or other user-interaction evaluations) for evaluating user proficiency with respect to different types of possible user interactions within a social networking platform. The user-interaction-evaluation system can then receive a request to initiate a particular user-interaction evaluation from the available user-interaction evaluations, such as by receiving a selection of an option to initiate the particular user-interaction evaluation.

Based on a request to initiate a user-interaction evaluation, in one or more embodiments, the user-interaction-evaluation system generates digital content for display within the social networking platform. Specifically, the user-interaction-evaluation system generates digital content (e.g., social networking posts, private/direct messages) and provides the digital content to users of the social networking platform. For instance, the user-interaction-evaluation system can execute a digital media bot as part of the user-interaction evaluation to generate the digital content. In some embodiments, the user-interaction-evaluation system generates digital content from an administrator account associated with the administrator client device in response to initiating the user-interaction evaluation. The user-interaction-evaluation system can then provide the digital content to one or more user accounts of one or more users of the social networking platform.

After initiating the user-interaction evaluation, the user-interaction-evaluation system can display parts of the user-interaction evaluation and tracking information for user interactions in separate portions of an administrator graphical user interface. In some cases, for instance, the user-interaction-evaluation system displays information associated with one or more user-interaction evaluations within a first portion (or portions) of the administrator graphical user interface. In particular, the user-interaction-evaluation system provides an evaluation dashboard within the first portion(s) of the administrator graphical user interface. To illustrate, the user-interaction evaluation can include educational or instructional information on a topic for digital media proficiency in a social networking environment (e.g., for appropriate online behaviors or data security/privacy). This disclosure describes a second portion(s) of the administrator graphical user interface further below in connection with detected user interactions.

When introducing targeted digital content or otherwise initiating a user-interaction evaluation, in some embodiments, the user-interaction-evaluation system detects user interactions between user accounts and the digital content within the social networking platform. For example, the user-interaction-evaluation system receives indications of actions by user accounts interacting with the digital content generated as part of the user-interaction evaluation. Specifically, the user-interaction-evaluation system can detect user interactions to reply to digital content, associate with digital content or user accounts/bot accounts (e.g., like, favorite, follow), send messages to other user accounts, share digital content, etc. In additional embodiments, the user-interaction-evaluation system detects interactions by user accounts with other social networking accounts (e.g., other user accounts or bot accounts) within the social networking platform.

As indicated above, in one or more embodiments, the user-interaction-evaluation system displays actions by user accounts interacting with digital content in a second portion (or portions) the administrator graphical user interface. In particular, the user-interaction-evaluation system can display real-time data for the actions within the second portion (or portions) of the administrator graphical user interface separate from the user-interaction evaluation information in the first portion(s). To illustrate, the user-interaction-evaluation system can segment the administrator graphical user interface into the first portion(s) and the second portion(s) based on initiating the user-interaction evaluation and display the user-interaction evaluation information in the first portion(s) and the user interactions in the second portion(s). Furthermore, in some cases, the user-interaction-evaluation system can provide the user interactions in real time or near-real time (e.g., as the user-interaction-evaluation system detects the user interactions) for display within the second portion(s) of the administrator graphical user interface.

In addition to displaying user interactions within the second portion(s) of the administrator graphical user interface, in one or more embodiments, the user-interaction-evaluation system displays generated digital content within the second portion(s). For instance, the user-interaction-evaluation system can display digital content generated by user accounts or by executing digital media bots within the second portion(s) along with user interactions to the digital content. Thus, the user-interaction-evaluation system can provide the administrator client device with the digital content from user accounts and bot accounts, along with user interactions with the digital content, in real time or near-real time within the second portion(s) of the administrator graphical user interface.

The disclosed user-interaction-evaluation system can provide a number of technical improvements to computing devices that implement social networking platforms. For example, the user-interaction-evaluation system generates an efficient and consolidated graphical user interface (or unified series of graphical user interfaces) for initiating user-interaction evaluations of digital media literacy and for providing user interaction data within a social networking platform. Specifically, in response to a request to initiate one or more user-interaction evaluations, the user-interaction-evaluation system generates and provides an improved user interface that includes both information for implementing the user-interaction evaluation and real-time (or near-real-time) social networking data. Such social networking data can provide up-to-date responses from users of the social networking platform for evaluating the digital media proficiency of the users.

As noted above, existing online systems limit tracking of user actions within a digital environment to one-by-one tracking of behavior and often force such tracking observers to navigate from user interface to user interface (or switching from user account to user account). In contrast to such existing systems, the user-interaction-evaluation system can consolidate multiple interactions from multiple user accounts—along with the corresponding digital content—into a single snapshot within a graphical user interface. In further contrast to existing systems, the user-interaction-evaluation system can integrate information about user-interaction evaluations (e.g., digital instruction material and options for activating portions of the user-interaction evaluations) into the graphical user interface to avoid forcing administrative devices to switch between separate software programs or between separate graphical user interfaces.

In addition to efficiently consolidating graphical-user-interface elements, the user-interaction-evaluation system incorporates an easy-to-use option that, upon selection, initiates a user-interaction evaluation with digital content targeted to elicit user interactions for the evaluation. By integrating options to generate targeted digital content with information for a user-interaction evaluation within an administrator graphical user interface, the user-interaction-evaluation system provides an efficient method for an administrator client device to quickly generate the digital content.

As noted above, some existing online systems would require users to switch between software programs, accounts, or graphical user interfaces to generate posts or other digital content from multiple accounts or from multiple bots. In contrast to such systems, the user-interaction-evaluation system introduces a selectable option that, upon selection, generates digital content for a user-interaction evaluation from a graphical user interface for a single administrative account. In some cases, the digital content manifests in different posts, accounts, or messages. With a simple click or touch gesture of a selectable option, for instance, the user-interaction-evaluation system can execute a digital media bot that generates digital content with which multiple users can interact within a social networking platform and for which an administrative user interface shows such user interactions.

Beyond improving user interfaces, the user-interaction-evaluation system also improves conventional online systems' flexibility by integrating a social networking platform with a digital media literacy system that utilizes digital media bots or other targeted software to implement user-interaction evaluations and evaluate users' digital media proficiency. As previously mentioned, existing online systems often restrict users from accessing certain information or protect users from actions by bots and external entities. By contrast, the user-interaction-evaluation system integrates digital media bots or other software into a social networking platform in connection with user-interaction evaluations within an administrator graphical user interface. By integrating the digital media bots or targeted software that mimics evaluation-targeted behavior into the social networking platform, the user-interaction-evaluation system can introduce users of the social networking platform to different digital media scenarios for the user-interaction-evaluation system to evaluate the users' proficiency in various areas of digital media. By using a consolidated user interface or a series of unified user interfaces, for instance, the user-interaction-evaluation system can execute digital media bots to generate social networking posts or messages and/or interact with user accounts in numerous ways while monitoring interactions by the user accounts with the digital content from the digital media bots or targeted software.

In addition to targeted digital content for improved training, the user-interaction-evaluation system improves the security of computing systems that implement social networking platforms. In particular, the user-interaction-evaluation system provides administrators with direct control over the digital content and user interactions accessible by client devices of user accounts of a social networking platform. Specifically, the user-interaction-evaluation system provides tools to an administrator device to activate or deactivate specific actions (e.g., user interactions) that user accounts can perform within a social networking platform via a plurality of individual client devices, such as by restricting the ability of a user account to reply to social networking posts, engage in direct messages, etc. For example, the user-interaction-evaluation system can utilize a closed social networking platform to control the digital content and process digital content and interactions between users within a closed social networking platform according to a structured evaluation environment—without exposing the users to security risks typical to existing online systems. The user-interaction-evaluation system also provides the administrator client device with control over functions of the social networking platform and user client devices remotely via the administrator graphical user interface. While existing online systems use conventional security tools to protect and insulate users from malicious bots or other data security risks, the user-interaction-evaluation system introduces a unique and improved digital training environment to target users with digital content to simulate malicious or risky user interactions for digital literacy.

As illustrated by the foregoing discussion, the present disclosure utilizes a variety of terms to describe features and advantages of the user-interaction-evaluation system. Additional detail is now provided regarding the meaning of such terms. As used herein, the term "social networking platform" refers to a digital platform that provides social networking services to computing devices associated with users. In one or more embodiments, a social networking platform includes social networking services for anonymous media sharing. A social networking service may be individual-centered or group-centered. In particular, a social networking platform includes a network that allows users to connect with other users (e.g., friends, associates) and communicate with each other. For example, a user of a social networking platform can create social network posts to share with other users connected to the user. Additionally, the user can view social network posts of other users, such as within a social network feed. In one or more embodiments, the social networking platform is a "closed social networking platform" accessible only to a predefined set of users, such as people in an educational environment (e.g., students and teacher(s) in a school class) and people in a corporate environment (e.g. employees and executives of the same company). Accordingly, people outside the predefined set of users are unable to sign up for the social networking platform or otherwise access the social networking platform.

As used herein, the term "user-interaction evaluation" refers to both information and a process for implementing a set of instructions to evaluate digital media literacy of users within a digital media platform. For example, a user-interaction evaluation includes a software process associated with a topic and a set of criteria for evaluating a plurality of users with respect to one or more aspects of the topic. In one or more embodiments, a user-interaction evaluation includes a plurality of software processes for analyzing user knowledge and abilities with respect to security and privacy settings within a social networking platform, user interactions with others within the social networking platform, or other possible actions within the social networking platform. To illustrate, topics for user-interaction evaluations can include, but are not limited to, login credentials (e.g., username/password), user agreements, profile data (e.g., bio, picture), or best practices for interacting on social media. Also as used herein, the term "digital media proficiency" refers to knowledge and abilities of a user related to one or more topics associated with a user-interaction evaluation.

As used herein, the term "digital media bot" refers to a software program or process for automatically performing one or more actions within a social networking platform as part of a user-interaction evaluation. Specifically, a digital media bot can interact with user accounts of a social networking platform. For example, a digital media bot can generate or retrieve from data storage social networking posts to send to one or more user accounts of a social networking platform. Additionally, a digital media bot can interact with digital content (e.g., social networking posts) generated by other user accounts. In one or more embodiments, a digital media bot may include an artificial intelligence service or other software algorithm for dynamically interacting with users based on user account settings associated with the users or based on digital content generated by the users. In some embodiments, digital media bots also interact with each other via the social networking platform, such as by sending social networking posts to each other and replying to social networking posts generated by digital media bots.

Furthermore, as used herein, the term "bot account" refers to a registered account associated with a digital media bot in a social networking platform. For example, a bot account includes a profile in the social networking platform for a digital media bot. Additionally, a digital media bot performs actions within the social networking platform via a corresponding bot account, similar to a user performing actions within the social networking platform via a corresponding user account. Additionally, as used herein, the term "user account" refers to a registered account associated with a user in a social networking platform. Thus, in one or more embodiments, a user account includes a profile in the social networking platform for a user, and the user performs actions within the social networking platform via the user account.

As used herein, the term "digital content" refers to computer representations of media. For example, digital content can include text, images, video, or audio within a digital environment. In one or more embodiments, digital content includes media uploaded by a user (e.g., a user client device) to a social networking platform for providing access to the media to one or more other users (e.g., via one or more other user client devices). Additionally, digital content can include information provided by a user to a social networking platform including, but not limited to, profile data or user account settings. In one or more embodiments the digital content includes digital content generated organically (by other users or administrators), by an artificial intelligence service or other software algorithm, or by pulling previously defined content from a data storage service, such as a database, flat file, etc.

As used herein, the term "digital media action" refers to an operation performed by a digital media bot or a user account relative to digital content or other accounts within a social networking platform. In one or more embodiments, a digital media action includes an operation to respond to digital content, associate with digital content, sharing the digital content, subscribe to receive content from a user account, or other interactions that bot accounts or user accounts may perform within the social networking platform.

As used herein, the term "digital-media-proficiency metric" refers to a quantitative measurement or score of digital media proficiency of a user within a social networking platform based on one or more criteria. For example, a digital-media-proficiency metric can include a measurement of a user's understanding of security or privacy settings within a social networking system. A digital-media-proficiency metric can also include a measurement of a user's understanding of the effects or appropriateness of interacting with other users within a social networking system. Accordingly, as used herein, the term "interaction score" refers to a measurement representing a value of an interaction by a user relative to digital content or other users or bots within a social networking platform. Additionally, the term "content score" refers to a measurement representing a value of digital content generated or provided to a social networking platform by a user or a bot.

As used herein, the term "administrator graphical user interface" refers to a digital interface for display on a computing device of an administrative user associated with administrating user-interaction evaluations for a group of users. Additionally, as used herein, the terms "first portion" and "second portion" of a graphical user interface refer to visually distinct regions of a graphical user interface that include different information simultaneously on a display device. In one or more embodiments, a first portion refers to one or more portions or sections of the graphical user interface. Similarly, a second portion refers to one or more portions or sections of the graphical user interface. For example, a first portion (or portions) can include an evaluation dashboard including information for an initiated user-interaction evaluation. In one or more embodiments, a second portion (or portions) can include real-time (or near-real-time) social networking data including digital content and user interactions associated with a plurality of user accounts within a social networking platform.

Turning now to the figures, FIG. 1 includes an embodiment of a system environment 100 in which a user-interaction-evaluation system 102 operates. In particular, the system environment 100 includes server device(s) 104, an administrator client device 106, and user client devices 108a-108n in communication via a network 110. Moreover, as shown, the user-interaction-evaluation system 102 on the server device(s) 104 includes a social networking platform 112. Additionally, the administrator client device 106 includes an administrator client application 114, and the user client devices 108a-108n include user client applications 116a-116n.

As shown in FIG. 1, the server device(s) 104 include or host the user-interaction-evaluation system 102. Specifically, the user-interaction-evaluation system 102 includes, or is part of, one or more systems that manage educational or instructional software. For instance, the user-interaction-evaluation system 102 can be part of a system that manages educational software for schools, other educational institutions, or corporate or professional environments. The user-interaction-evaluation system 102 can also be part of a system that manages instructional software for business entities. In one or more embodiments, the user-interaction-evaluation system 102 includes the social networking platform 112 for utilizing the educational or instructional software in providing education regarding privacy and security within a social networking environment.

To illustrate, the user-interaction-evaluation system 102 can manage the security and privacy of user data in the social networking platform 112. For example, the user-interaction-evaluation system 102 provides tools for an administrator of the social networking platform 112 to monitor user settings and user behavior within the social networking platform 112. To illustrate, the user-interaction-evaluation system 102 can provide an administrator graphical user interface for accessing the tools via the administrator client application 114 on the administrator client device 106. In one or more embodiments, the user-interaction-evaluation system 102 includes a plurality of user-interaction evaluations corresponding to a plurality of different topics related to social networking for providing education or instruction to a plurality of users (e.g., users associated with the user client devices 108a-108n). Additionally, in one or more embodiments, the user-interaction-evaluation system 102 includes (or accesses from an external system) digital media bots to utilize as part of one or more user-interaction evaluations.

According to one or more embodiments, the social networking platform 112 includes a social networking environment by which a plurality of users can generate digital content and interact with each other or digital content of other users. Specifically, the user-interaction-evaluation system 102 can register users with user accounts for the social networking platform 112 by which the users interact with each other. Additionally, the user-interaction-evaluation system 102 can create bot accounts for digital media bots to use to perform actions within the social networking platform 112. The user-interaction-evaluation system 102 can then provide tools for users to access via user graphical user interfaces in the user client applications 116a-116n on the user client devices 108a-108n.

In one or more embodiments, the social networking platform 112 is a closed social networking platform that provides access only to a predefined set of users determined by the user-interaction-evaluation system 102, such as a set of users in an educational/instructional group (e.g., students) or employees of a business. In such embodiments, the user-interaction-evaluation system 102 can control all aspects of the social networking platform 112 and prevent outside access to the social networking platform 112. Additionally, in one or more embodiments, the social networking platform 112 is limited to access by the user client devices 108a-108n over a local area network. Additionally, the user-interaction-evaluation system 102 may limit access to the social networking platform 112 over the internet by the administrator client device 106. Furthermore, the user-interaction-evaluation system 102 can delete all digital content generated by users after completion of one or more user-interaction evaluations.

According to one or more embodiments, the user-interaction-evaluation system 102 manages communications sent to the social networking platform 112 or communications sent between client devices via the social networking platform 112. For instance, the user-interaction-evaluation system 102 can receive data from the user client devices 108a-108n to provide information to the social networking platform 112, generate digital content on the social networking platform 112, or interact with other users (e.g., via corresponding user client devices) or digital content using the social networking platform 112. Additionally, the user-interaction-evaluation system 102 can utilize data received from the user client devices 108a-108n to determine a digital media proficiency of each user of the social networking platform 112.

The user-interaction-evaluation system 102 can also provide data received from the user client devices 108a-108n to the administrator client device 106 within the administrator graphical user interface of the administrator client application 114. Furthermore, the user-interaction-evaluation system 102 can provide user-interaction evaluation information and user social networking data within separate portions of the administrator graphical user interface of the administrator client application 114. The user-interaction-evaluation system 102 can further provide additional controls to the administrator client device 106 for managing access to actions or data within the social networking platforms 112 by the user client devices 108a-108n.

In one or more embodiments, the user-interaction-evaluation system 102 can provide management of educational or instructional software for a plurality of different sets of administrator/users. To illustrate, the user-interaction-evaluation system 102 can provide a separate instance of the social networking platform 112 (or separate social networking platforms) to each set of client devices (e.g., in which a set includes an administrator client device and user client devices). More specifically, the user-interaction-evaluation system 102 can provide a first instance of the social networking platform 112 to the administrator client device 106 and the user client devices 108a-108n. The user-interaction-evaluation system 102 can provide a second instance of the social networking platform 112 to a different administrator client device and different user client devices. Each set of administrator/users can thus access only the instance of the social networking platform 112 provided by the user-interaction-evaluation system 102.

In one or more embodiments, the server device(s) 104 include a variety of computing devices, including those described below with reference to FIG. 5. For example, the server device(s) 104 includes one or more servers for storing and processing data associated with user-interaction evaluations and the social networking platform 112. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes the administrator client device 106 and the user client devices 108a-108n. In one or more embodiments, each of the administrator client device 106 and the user client devices 108a-108n includes, but is not limited to, a mobile device (e.g., smartphone or tablet), a laptop, a desktop, including those explained below with reference to FIG. 5. Furthermore, although not shown in FIG. 1, each of the administrator client device 106 and the user client devices 108a-108n can be operated by a user (e.g., an administrator or a user included in, or associated with, the system environment 100) to perform a variety of functions. In particular, the administrator client device 106 and the user client devices 108a-108n perform functions such as, but not limited to, accessing, viewing, analyzing, and interacting with digital content within the social networking platform 112 via the administrator client application 114 and the user client applications 116a-116n, respectively. The administrator client device 106 also performs functions for viewing or otherwise accessing data associated with evaluating a digital media proficiency of users within a social networking environment of the social networking platform 112 as determined by the user-interaction-evaluation system 102. Although FIG. 1 illustrates the system environment 100 with a single administrator client device 106 and the user client devices 108a-108n, the system environment 100 can include a different number of administrator client devices or user client devices.

Additionally, as shown in FIG. 1, the system environment 100 includes the network 110. The network 110 activates communication between components of the system environment 100. In one or more embodiments, the network 110 may include the Internet or World Wide Web. In one or more embodiments, the network 110 includes various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the administrator client device 106, and the user client devices 108a-108n communicate via the network 110 using one or more communication platforms and technologies suitable for transporting data and/or communication signals, including any known communication technologies, devices, media, and protocols supportive of data communications, examples of which are described with reference to FIG. 5.

Although FIG. 1 illustrates the server device(s) 104, the administrator client device 106, and the user client devices 108a-108n communicating via the network 110, in alternative embodiments, the various components of the user-interaction-evaluation system 102 communicate and/or interact via other methods (e.g., the server device(s) 104, the administrator client device 106, and the user client devices 108a-108n can communicate directly). Furthermore, although FIG. 1 illustrates the user-interaction-evaluation system 102 being implemented by a particular component and/or device within the system environment 100, the user-interaction-evaluation system 102 can be implemented, in whole or in part, by other computing devices and/or components in the system environment 100 (e.g., the administrator client device 106).

Additionally, digital media bots that the user-interaction-evaluation system 102 utilizes may be implemented at the server device(s) 104 or at one or more other server devices or systems.

Figure 2:
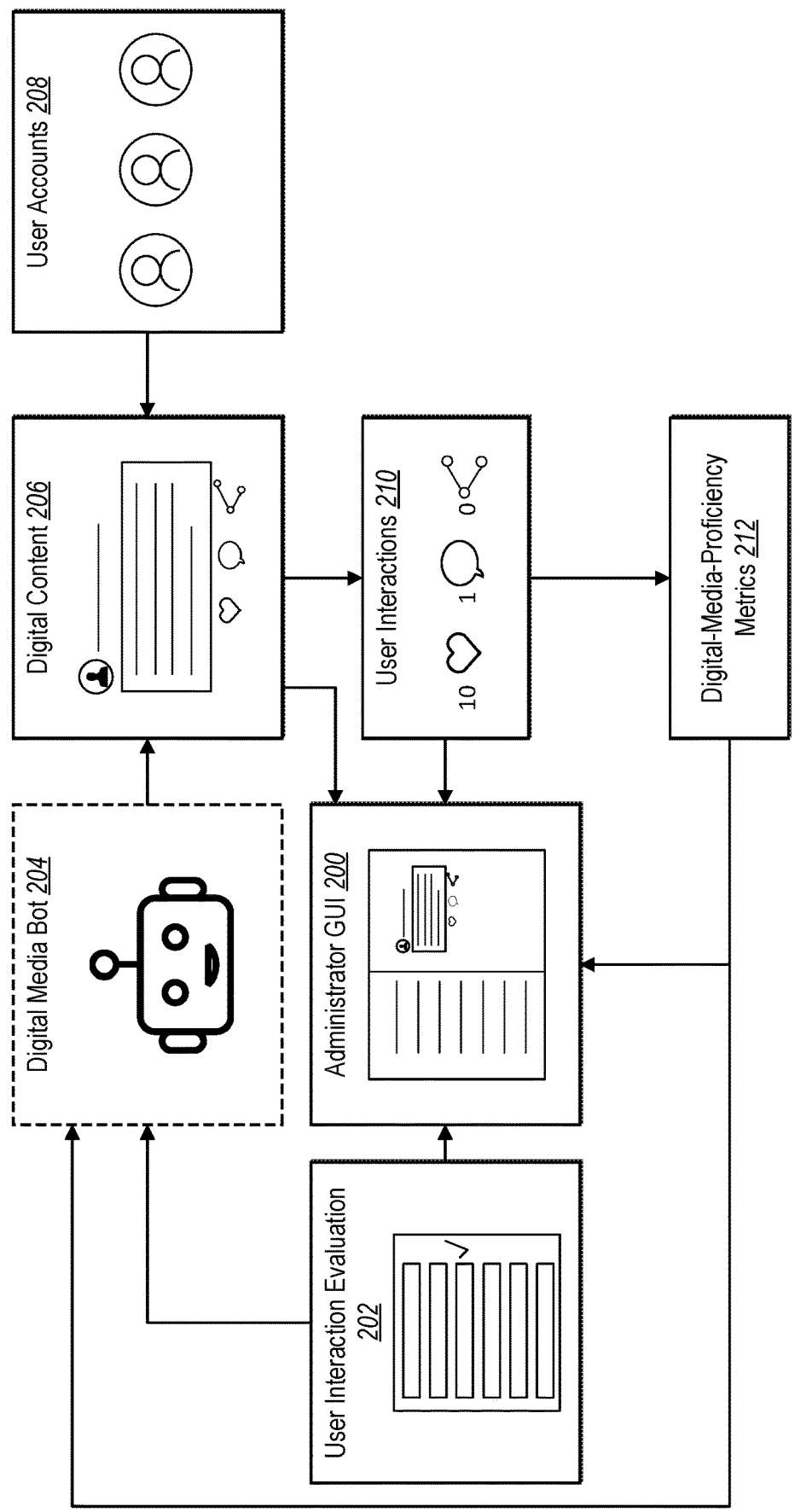
FIG. 2 illustrates an overview diagram of the user-interaction-evaluation system providing an efficient administrator graphical user interface for displaying user-interaction evaluation information and depicting user interactions within a social networking system in accordance with one or more implementations.

As mentioned above, the user-interaction-evaluation system 102 manages an administrator graphical user interface for implementing a user-interaction evaluation and determining digital media literacy of users within a social networking platform. For example, FIG. 2 illustrates that the user-interaction-evaluation system 102 initiates a user-interaction evaluation to evaluate the digital media proficiency of a plurality of users within a social networking environment. More specifically, the user-interaction-evaluation system 102 provides an administrator graphical user interface for managing digital content and interactions by user accounts within the social networking platform.

As shown in FIG. 2, the user-interaction-evaluation system 102 provides an administrator graphical user interface ("administrator GUI 200") for managing evaluations of digital media proficiency of users. For instance, the administrator GUI 200 is part of an administrator client application that operates on an administrator client device. In one or more embodiments, the administrator GUI 200 includes a number of different interfaces and tools for initiating user-interaction evaluations, administering aspects of the user-interaction evaluations, managing data associated with users within a social networking platform, and evaluating digital media proficiency of the users. Accordingly, the user-interaction-evaluation system 102 can provide an efficient interface for managing a variety of operations and information associated with evaluating digital media proficiency of the users.

FIG. 2 illustrates that the user-interaction-evaluation system 102 initiates a user-interaction evaluation 202 to determine the digital media proficiency of a plurality of users. In particular, the user-interaction evaluation 202 can correspond to a particular topic on user interactions or digital content in social networking and/or other online behavior. In one or more embodiments, the user-interaction-evaluation system 102 provides a plurality of available user-interaction evaluations corresponding to a plurality of different topics for display within the administrator GUI 200. In response to receiving a selection of a user-interaction evaluation, the user-interaction-evaluation system 102 initiates the selected user-interaction evaluation (e.g., the user-interaction evaluation 202). The user-interaction-evaluation system 102 can initiate the user-interaction evaluation 202 to provide education materials or instruction materials to the users and/or to initiate one or more actions within a social networking platform.

In connection with initiating the user-interaction evaluation, the user-interaction-evaluation system 102 provides information associated with the user-interaction evaluation to the administrator client device for displaying within the administrator GUI 200. For example, as mentioned, a user-interaction evaluation can include education materials or instruction materials. The user-interaction-evaluation system 102 can provide such materials for display within a first portion (or portions) of the administrator GUI 200. The user-interaction evaluation can also include other information and/or actions associated with managing the user-interaction evaluation and/or managing aspects of the social networking platform.

In one or more embodiments, as FIG. 2 illustrates, the user-interaction-evaluation system 102 optionally executes a digital media bot 204 as part of the user-interaction evaluation 202. For example, the user-interaction-evaluation system 102 can execute the digital media bot 204 to perform one or more actions associated with a topic of the user-interaction evaluation 202 in response to a request to execute the digital media bot 204 via the administrator GUI 200. Alternatively, the user-interaction-evaluation system 102 can automatically execute the digital media bot 204 in response to initiating the user-interaction evaluation 202.

In one or more embodiments, by executing the digital media bot 204, the user-interaction-evaluation system 102 causes the digital media bot 204 to generate digital content 206 within the social networking platform. For instance, the user-interaction-evaluation system 102 can utilize the digital media bot 204 to generate the digital content 206 to publish to the social networking platform. Additionally, the digital media bot 204 can be associated with a bot account in the social networking platform (e.g., a social networking account registered for the digital media bot 204). Accordingly, the user-interaction-evaluation system 102 can execute the digital media bot 204 to perform the one or more actions within the social networking platform via the bot account. In additional embodiments, the user-interaction-evaluation system 102 utilizes the digital media bot 204 to interact with users within the social networking platform.

In one or more embodiments, the digital media bot 204 includes a software process that functions independently from any user control (e.g., independently from an administrator). The digital media bot 204 can interact with user accounts by sending direct messages, posting microblogs (including comments, replies, and images), interacting with microblogs (e.g., liking and sharing), posting notifications, submitting friend and follower requests, cloning accounts, phishing, extorting, and bullying of other bot accounts or user accounts. Accordingly, the digital media bot 204 can interact with users and content within the social networking platform in a variety of ways according to user-interaction evaluations.

Each user-interaction evaluation can have a corresponding digital media bot that performs specific actions based on the topic of the user-interaction evaluation. Furthermore, each digital media bot can include, but is not limited to, the following elements that determine behavior of the digital media bot and other data associated with the digital media bot: whether the digital media bot is activated, ID, type, news (digital media bot only displays notification posts), user (e.g., digital media bot has a bot account to interact with other users), username (applicable to user bots), and one or more actions that the digital media bot can perform. Furthermore, in one or more embodiments, a digital media bot includes data for (or associated with) initiating an action including, but is not limited to, the following elements: whether the action is activated, a trigger event indicating when to execute the action, a trigger event timestamp, a trigger delay to indicate how long to wait before executing the action, an action description, text and/or images associated with the action, and whether the action is executed to prevent a digital media bot from executing the action more than once.

Additionally, FIG. 2 shows that the user-interaction-evaluation system 102 includes user accounts 208 associated with a plurality of users. Specifically, the user accounts 208 can include accounts registered for a plurality of users of the social networking platform. For instance, the user-interaction-evaluation system 102 can create user accounts for a predefined set of users as determined by an administrator, such as students in a class. In one or more embodiments, the user-interaction-evaluation system 102 creates user accounts for the users as part of the user-interaction evaluation 202.

To illustrate, the user-interaction evaluation 202 can include instructions for generating the user accounts 208. The user-interaction-evaluation system 102 can then require the users to generate the user accounts 208 by providing specific information to the user-interaction-evaluation system 102.

Additionally, FIG. 2 illustrates that the user accounts 208 contribute to the digital content 206. For example, computing devices associated with the user accounts 208 can generate social network posts, private messages, or other digital content (e.g., by corresponding users utilizing tools provided to user client devices). The computing devices associated with the user accounts 208 can then provide the digital content 206 to the user-interaction-evaluation system 102 for publishing to the social networking platform. In one or more embodiments, the user-interaction-evaluation system 102 sends the digital content 206 from the user accounts 208 or from the digital media bot 204 to one or more other user accounts within the social networking platform.

In addition (or in the alternative) to digital content from user accounts, in some embodiments, an administrator account associated with an administrator client device also generates digital content within the social networking platform. In particular, a computing device associated with the administrator account can generate social network posts, private messages, or other digital content to provide to user accounts 208. Furthermore, the computing device associated with the administrator account can generate digital content in connection with the user-interaction evaluation 202 to provide to the user accounts 208.

FIG. 2 also illustrates that the user-interaction-evaluation system 102 detects user interactions 210 within the social networking platform. For instance, the user-interaction-evaluation system 102 can detect a user interaction by a computing device associated with a user account with the digital content 206 generated by another user account, by the digital media bot 204, or by an administrator account. To illustrate, the user-interaction-evaluation system 102 can detect interactions by the user accounts 208 to respond to, associate with, or share the digital content 206 within the social networking platform. Additionally, the user-interaction-evaluation system 102 can detect interactions by the user accounts 208 with respect to the digital media bot 204 or the user accounts 208.

As FIG. 2 further illustrates, the user-interaction-evaluation system 102 can provide the digital content 206 and the user interactions 210 for display within the administrator GUI 200. In one or more embodiments, the user-interaction-evaluation system 102 provides the digital content 206 and the user interactions 210 to the administrator client device for display within a second portion (or portions) of the administrator GUI 200. In additional embodiments, the user-interaction-evaluation system 102 can provide additional information from the social networking platform to the administrator client device, including information associated with bot accounts and/or the user accounts 208. The administrator client device can then simultaneously display information associated with the user-interaction evaluation 202 in the first portion(s) of the administrator GUI 200 and the digital content 206 and user interactions 210 in the second portion(s) of the administrator GUI 200.

As FIG. 2 illustrates, the user-interaction-evaluation system 102 can also grade interactions or digital content within a social networking platform to determine digital media proficiency of the users. For example, the user-interaction-evaluation system 102 can generate digital-media-proficiency metrics 212 that represent the digital media proficiency of the users based on the digital content 206 and the user interactions 210. In one or more embodiments, the user-interaction-evaluation system 102 generates the digital-media-proficiency metrics 212 based on digital content 206 and user interactions 210 corresponding to a plurality of user-interaction evaluations to determine the digital media proficiency of the user accounts 208 for a plurality of different topics.

In some embodiments, the user-interaction-evaluation system 102 generates the digital-media-proficiency metrics 212 based on interaction scores for the user interactions 210 and content scores for the digital content 206. For instance, the interaction scores can indicate whether the user interactions 210 were positive interactions, negative interactions, or neutral interactions based on the digital content 206 (e.g., based on the content scores). Additionally, a positive interaction with certain digital content can result in a higher interaction score (e.g., indicating a good digital-media-proficiency metric for a user), while a bad interaction with certain digital content can result in a lower interaction score (e.g., indicating a poor digital-media-proficiency metric for the user). The user-interaction-evaluation system 102 can also provide the digital-media-proficiency metrics 212 to the administrator client device for display within the administrator GUI 200 (e.g., in a separate interface or portion).

As illustrated in FIG. 2, the user-interaction-evaluation system 102 can send the digital-media-proficiency metrics 212 to the digital media bot 204 to cause the digital media bot 204 to perform one or more additional actions. For example, in response to the user-interaction-evaluation system 102 determining that the digital-media-proficiency metrics 212 are unacceptable (e.g., relative to one or more threshold metric values), the user-interaction-evaluation system 102 can utilize the digital media bot 204 to issue additional digital content to further instruct/educate users associated with the user accounts 208. To illustrate, in response to determining that the digital-media-proficiency metrics 212 indicate a poor performance or understanding of one or more users relative to a given topic, the user-interaction-evaluation system 102 can utilize the digital media bot 204 to generate additional digital content related to the topic.

FIGS. 3A-3I illustrate graphical user interfaces for client devices associated with a social networking platform of the user-interaction-evaluation system 102. Specifically, FIGS. 3A-3B and 3E-3F illustrate graphical user interfaces on an administrator client device for initiating user-interaction evaluations and managing user interactions in a social networking platform. Additionally, FIGS. 3C-3D and 3G-3I illustrate graphical user interfaces on a user client device for performing actions to generate digital content, interact with digital content or other user accounts, and manage user account settings within the social networking platform.

Figure 3A:
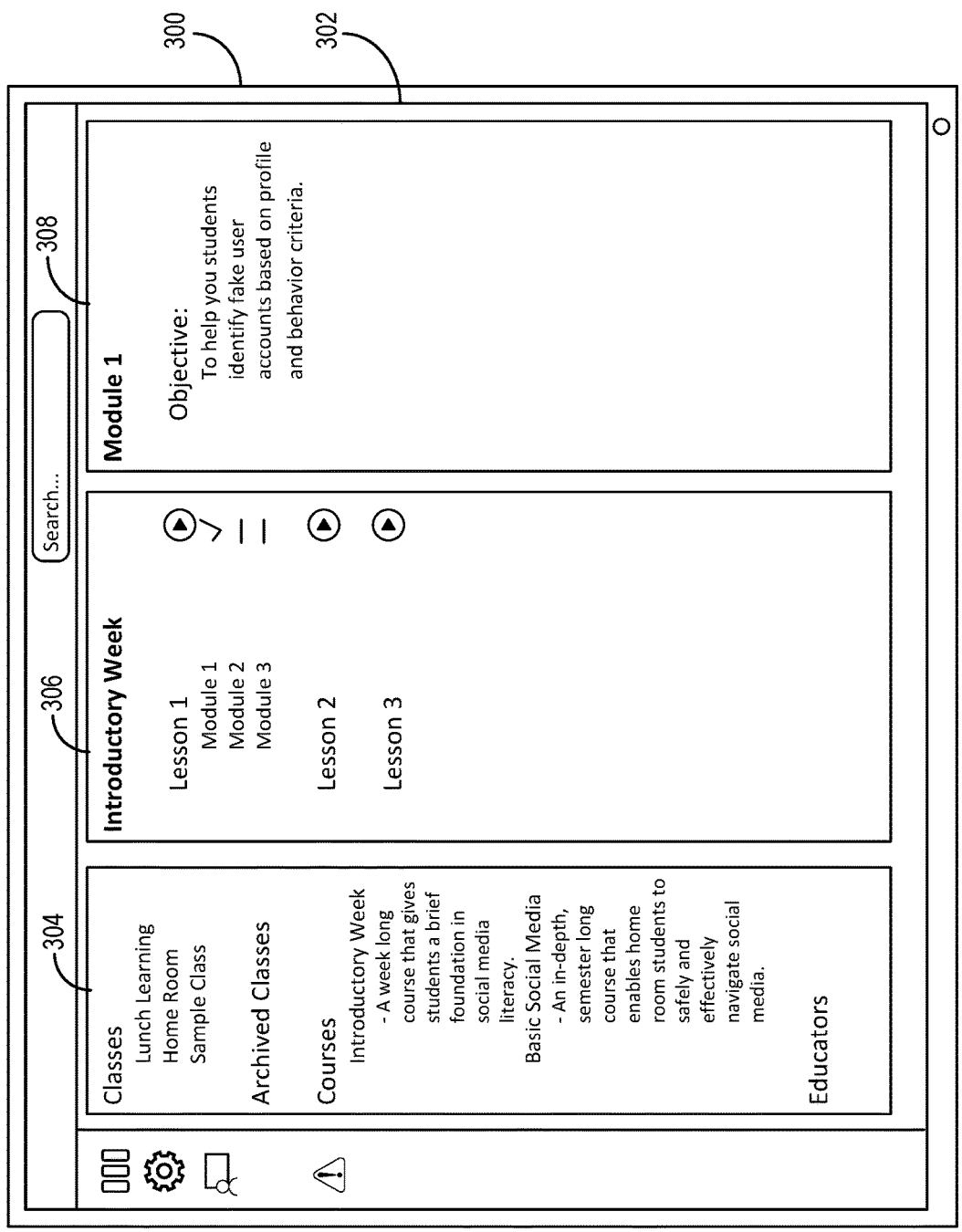
FIGS. 3A-3I illustrate example graphical user interfaces for implementing user-interaction evaluations in a social networking platform in accordance with one or more implementations.

For example, FIG. 3A illustrates an administrator client device 300 including an administrator graphical user interface 302 for an administrator client application of the user-interaction-evaluation system 102. For example, the user-interaction-evaluation system 102 provides, via the administrator graphical user interface 302, data associated with managing and initiating one or more user-interaction evaluations as part of a structured educational system. To illustrate, the administrator graphical user interface 302 of FIG. 3A includes a course interface 304 that includes an organized set of courses available to an administrator. For instance, the organized set of courses can include one or more courses (e.g., school courses, business courses) available for providing education or instructing a group of users (e.g., students in a school class or employees in a business).

The course interface 304 can also include a number of groups of users to which the administrator can present information from the courses.

Additionally, each course in the course interface 304 can include one or more user-interaction evaluations on various topics related to an overall category of the course. For instance, as FIG. 3A illustrates, selecting a course causes the user-interaction-evaluation system 102 to provide a user-interaction evaluation interface 306 including a plurality of user-interaction evaluations for evaluating digital media literacy of a group of users. In particular, the user-interaction-evaluation system 102 can organize the user-interaction evaluations according to a lesson plan, similar topics, instruction order, or other organizational structure. The administrator client device 300 can receive one or more inputs selecting one or more user-interaction evaluations via the user-interaction evaluation interface 306 (e.g., as indicated by the check mark for "Module 1") for previewing or initiating the user-interaction evaluation(s).

In one or more embodiments, the user-interaction-evaluation system 102 also provides, via the administrator graphical user interface 302, a preview interface 308 to display a preview of a selected user-interaction evaluation. Specifically, FIG. 3A illustrates that the administrator client device 300 displays a preview of a selected user-interaction evaluation within the preview interface 308 in response to a selection by the administrator of the user-interaction evaluation within the user-interaction evaluation interface 306. Additionally, the preview interface 308 can include information about the user-interaction evaluation such as, but not limited to, an objective of the user-interaction evaluation, a lesson plan associated with the user-interaction evaluation, or a preview of selectable elements that become available upon initiating the user-interaction evaluation. In response to a selection of more than one user-interaction evaluation, the user-interaction-evaluation system 102 can combine previews of the selected user-interaction evaluations within the preview interface 308.

Figure 3B:
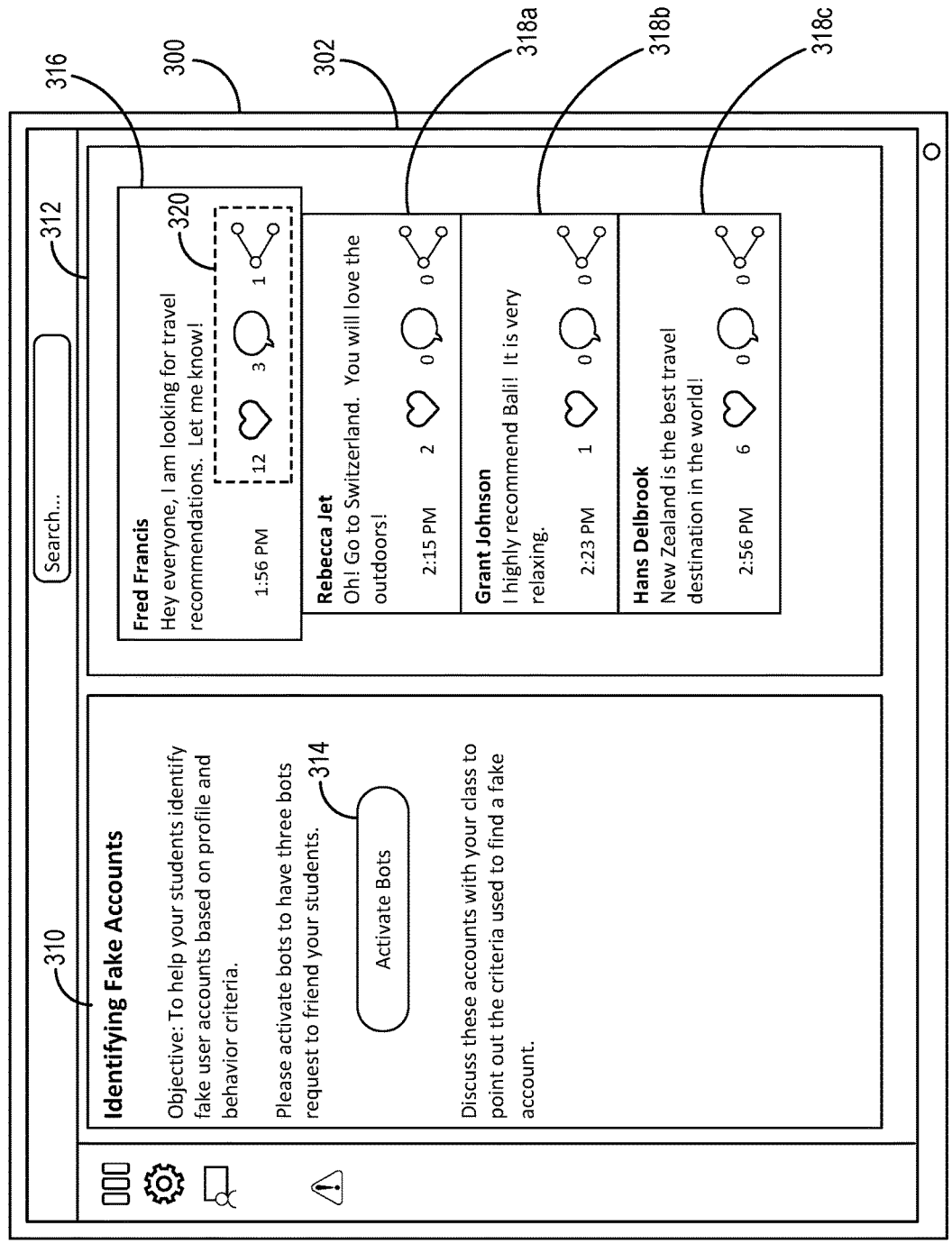

According to one or more embodiments, after the user-interaction-evaluation system 102 has received a request to initiate one or more of the user-interaction evaluations, the user-interaction-evaluation system 102 can initiate the user-interaction evaluation(s). For example, FIG. 3B illustrates that the user-interaction-evaluation system 102 segments the administrator graphical user interface 302 into a plurality of portions for displaying different content associated with the user-interaction evaluation. Specifically, FIG. 3B illustrates a first portion 310 of the administrator graphical user interface 302 and a second portion 312 of the administrator graphical user interface 302.

In one or more embodiments, the user-interaction-evaluation system 102 provides information associated with an initiated user-interaction evaluation within the first portion 310 of the administrator graphical user interface 302. Specifically, a user-interaction evaluation can include educational/instructional materials for an administrator to use during administration of the user-interaction evaluation. For example, FIG. 3B illustrates that the user-interaction-evaluation system 102 provides, for display within the first portion 310 of the administrator graphical user interface 302, instructions for the administrator to follow. To illustrate, the first portion 310 includes an objective for the user-interaction evaluation, text instructing the administrator to activate digital media bots related to the user-interaction evaluation, and follow-up instructions.

Additionally, the user-interaction-evaluation system 102 can provide, for display on the administrator client device 300, a bot activation element 314 for executing one or more actions by one or more digital media bots as part of the user-interaction evaluation. As shown in FIG. 3B, the bot activation element 314 can constitute a graphical element that can be selected by a user. As indicated by the instructions presented within the first portion 310 of the administrator graphical user interface 302, upon receiving a selection of the bot activation element 314 from the administrator client device 300, the user-interaction-evaluation system 102 executes three separate digital media bots to generate digital content including messages to users requesting to be added to the users' friend lists. In response to detecting a selection of the bot activation element 314, the user-interaction-evaluation system 102 can execute the digital media bots to perform the action of sending private messages to the user accounts. Although FIG. 3B illustrates a separate element for executing digital media bots and/or actions, in some embodiments, initiating a user-interaction evaluation automatically executes digital media bots.

Additionally, as mentioned, FIG. 3B illustrates that the second portion 312 of the administrator graphical user interface 302 includes activity within the social networking platform. In particular, the second portion 312 can include digital content generated by computing devices associated with user accounts, bot accounts, or an administrator account. Additionally, the second portion 312 can include responses to digital content or other user accounts within the social networking platform. To illustrate, the second portion 312 can include social networking posts generated by user accounts and/or bot accounts (e.g., a first social networking post 316 generated by a first user account).

The user-interaction-evaluation system 102 can then receive and provide to the administrator client device 300 replies by other user accounts to the first social networking post 316. For instance, the user-interaction-evaluation system 102 can receive a second social networking post 318a, a third social networking post 318b, and a fourth social networking post 318c as replies to the first social networking post 316. The user-interaction-evaluation system 102 can provide, for display within the second portion 312 of the administrator graphical user interface 302, the received replies in the order in which the user-interaction-evaluation system 102 received the replies (or in the order in which user accounts generated the replies).

As further shown in FIG. 3B, the administrator client device 300 can display digital content generated by user accounts and/or bot accounts within the second portion 312. For example, in response to detecting a selection of the bot activation element 314 and executing a digital media bot to generate and send a private message to one or more user accounts, the user-interaction-evaluation system 102 can provide the private message generated by the digital media bot for display within the second portion 312. To illustrate, the user-interaction-evaluation system 102 can provide, for display on the administrator client device 300, the digital content generated by the digital media bot and information indicating user accounts that received the digital content. Thus, if the digital media bot generates and sends friend requests to one or more user accounts, the user-interaction-evaluation system 102 can provide the friend request(s) for display in the second portion 312 of the administrator graphical user interface 302.

The user-interaction-evaluation system 102 can also detect actions by user accounts interacting with digital content. For example, social networking posts can include a number of different possible actions for interacting with the social networking posts including, but not limited to, liking a post, responding to a post, or sharing a post. Additionally, the user-interaction-evaluation system 102 can provide options for user accounts to report digital content or user/bot accounts, hide digital content from user/bot accounts, or block digital content from user/bot accounts. In response to receiving an indication of an action performed by a user account interacting with digital content, the user-interaction-evaluation system 102 can update the second portion 312 with the received indication. To illustrate, the user-interaction-evaluation system 102 can provide, for display on the administrator client device 300, interactions 320 with social networking posts in a format consistent with the social networking platform.

Additionally, the user-interaction-evaluation system 102 can provide user interactions in a list of interactions, which the administrator client device 300 can sort based on chronological order, user account, or digital content. The administrator client device 300 can also provide filters for an administrator to use in finding specific interaction types, interactions with specific interaction scores (e.g., positive interactions, negative interactions), interactions with bot accounts, or interactions with specific digital content types. Accordingly, the user-interaction-evaluation system 102 can provide the administrator client device 300 with a number of different tools for monitoring the user interactions by user accounts within the social networking platform while also administering or viewing information associated with the user-interaction evaluation.

In one or more embodiments, the user-interaction-evaluation system 102 provides user interactions to delete or remove digital content that the user accounts generated. In particular, a user account can generate and then delete digital content (e.g., a social networking post or a private message) within the social networking platform. While the user-interaction-evaluation system 102 can remove the digital content from view by other user accounts, the user-interaction-evaluation system 102 can maintain access to the digital content by the administrator client device 300. Although not shown, the administrator client device 300 can display deleted content within the second portion 312 of the administrator graphical user interface 302. The administrator client device 300 can also display an indication of the deleted content within the second portion 312. To illustrate, even if a user account deletes a social networking post (e.g., the second social networking post 318a), the administrator device 300 can display the deleted post along with a notification of the action to delete the post within the second portion 312. Thus, an administrator can easily view digital content that may be inappropriate and be cause for action against a user account.

In some embodiments, the user-interaction-evaluation system 102 also provides, to the administrator client device 300, changes to user account settings or other actions performed by user accounts that do not involve interactions with other user accounts or digital content. For example, the second portion 312 can also include indications of changes to user account settings by user accounts within the social networking platform. To illustrate, the second portion 312 can include modifications to security or privacy settings for a user account. Additionally, the second portion 312 can include modifications to notification settings for a user account.

Figure 3C:
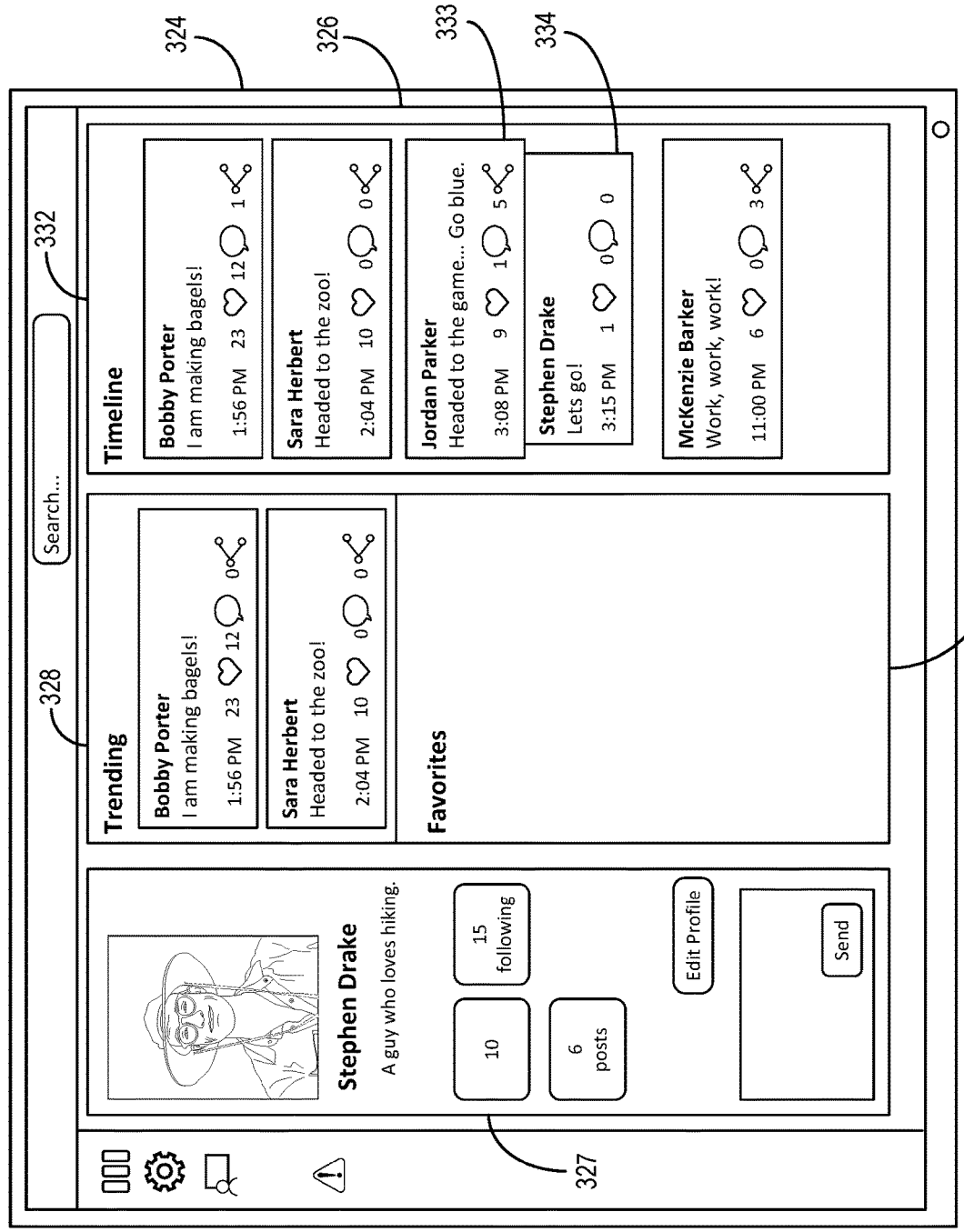

In connection with initiating a user-interaction evaluation, the user-interaction-evaluation system 102 can activate access to a social networking platform by a plurality of users. For example, FIG. 3C illustrates an embodiment of a user client device 324 displaying a user graphical user interface 326 for a user client application associated with the social networking platform. The user-interaction-evaluation system 102 can provide users with tools for generating digital content or interacting with digital content or users within the social networking platform.

FIG. 3C illustrates that the user client device 324 displays a user profile 327 including profile details associated with a user account associated with a user. Specifically, the user-interaction-evaluation system 102 receives information from the user client device 324 to include in the user profile 327. For instance, the user client device 324 can provide a profile image and/or a profile bio including information about the user. The user profile 327 can also include additional detail associated with the user account based on user account activity and user account settings.

Additionally, FIG. 3C illustrates that the user client device 324 displays, within the user graphical user interface 326, a plurality of interfaces corresponding to digital content generated by the user account, by other user accounts, or by bot accounts. For example, FIG. 3C illustrates a trending interface 328 that includes social networking posts that meet an interaction threshold (e.g., a number of responses, likes, or shares). FIG. 3C also illustrates that the user client device 324 displays a favorites interface 330 that includes digital content that the user account has marked or selected as a favorite (e.g., for quick access at a later date or for displaying to other user accounts in connection with the user profile 327). FIG. 3C further illustrates a timeline interface 332 including recent social networking posts generated by user accounts of the social networking platform.

In particular, as illustrated in FIG. 3C, the timeline interface 332 includes social networking posts (e.g., a first social networking post 333) or other digital content (e.g., images/video) generated by one or more user accounts associated with the user account corresponding to the user client device 324. To illustrate, the user account can include or be associated with a friend list that includes one or more user accounts of the social networking platform. In some embodiments, the user-interaction-evaluation system 102 provides digital content generated by user accounts to the user client device 324 for display within the timeline interface 332 as the digital content is generated.

Additionally, the user-interaction-evaluation system 102 can receive indications of interactions with digital content generated by user accounts. For instance, the user-interaction-evaluation system 102 can detect interactions by the user of the user client device 324 to view, select, respond to, like, report, block, or otherwise interact with social networking posts within the timeline interface 332. The user-interaction-evaluation system 102 can cause the user client device 324 and other user client devices associated with the social networking platform to display indications of the interactions.

As further illustrated by FIG. 3C, the user-interaction-evaluation system 102 can provide for display at the user client device 324 the interactions within the timeline interface 332 with the corresponding digital content. To illustrate, in response to receiving a response 334 to the first social networking post 333 by the user account, the user-interaction-evaluation system 102 can provide, for display within the timeline interface 332 on the user client device 324, the response 334 with the first social networking post 333.

Additionally, the user-interaction-evaluation system 102 can detect interactions by the user of the user client device 324 to view, follow, report, block, or otherwise interact with other accounts of the social networking platform. The user-interaction-evaluation system 102 can store such interactions in connection with the user account (e.g., in a database of user interactions and/or in the user account itself). The user-interaction-evaluation system 102 can provide indications of such interactions to the user client device 324 upon request (e.g., with a user account history). In one or more embodiments, the user-interaction-evaluation system 102 keeps such interactions private for only the user account and an administrator account to access.

Figure 3D:
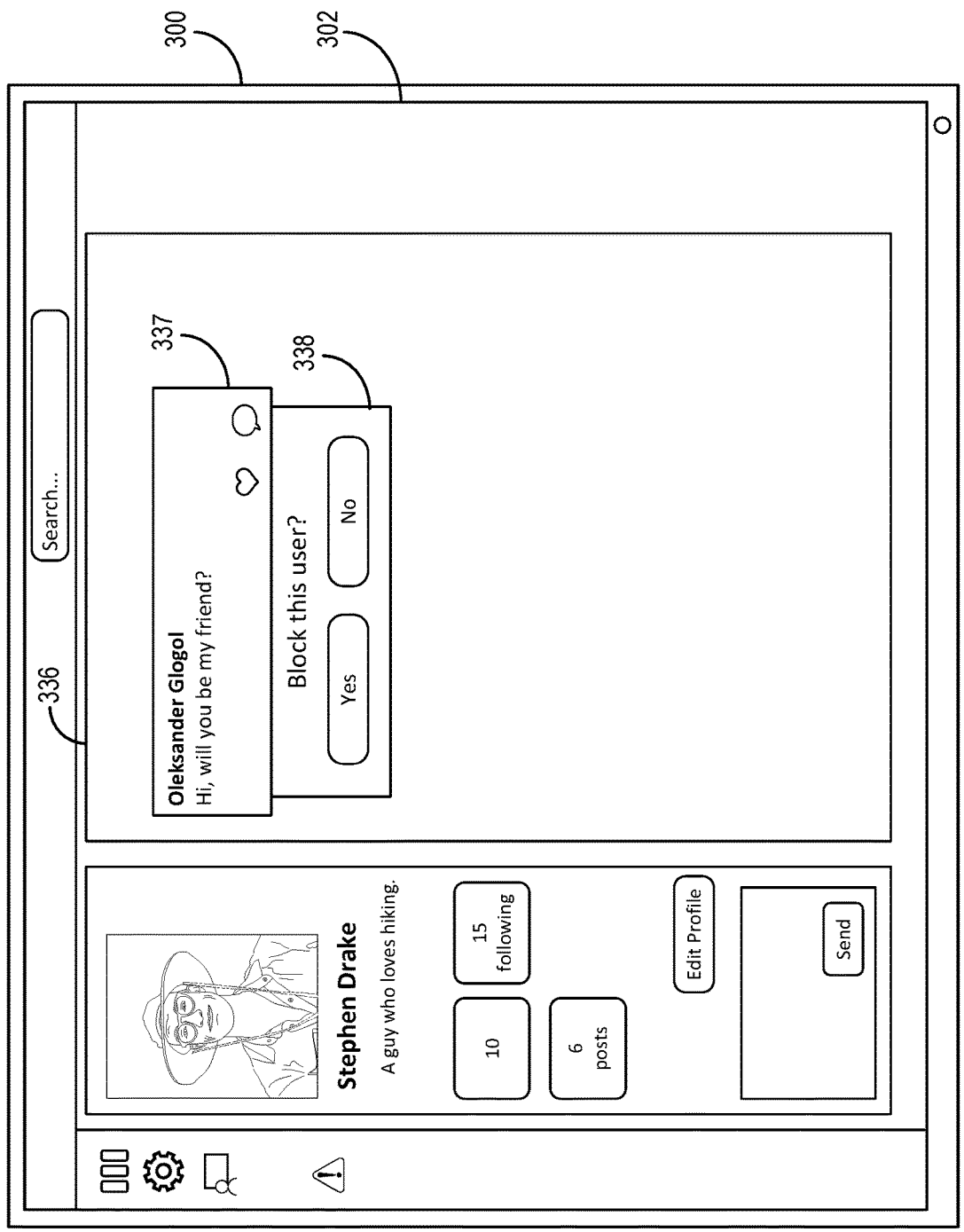

FIG. 3D illustrates that the user client device 324 displays additional information or interfaces within the user graphical user interface 326 of the user client application. In particular, the user client device 324 can display a private message interface 336 for displaying private messages exchanged between the user account and other user accounts within the social networking platform. Additionally, in one or more embodiments, the user-interaction-evaluation system 102 executes a digital media bot to generate a private message 337 from a bot account to the user account as part of a user-interaction evaluation. Accordingly, FIG. 3D illustrates that the private message interface 336 includes the private message 337 from the bot account to the user account.

After the user client device 324 receives the private message 337 and displays the private message 337 in the private message interface 336, the user-interaction-evaluation system 102 can provide tools for interacting with the private message 337. For example, the user client device 324 can display tools for the user to respond to, like, favorite, delete, or otherwise interact with the private message 337 via the user account. In one or more embodiments, the user-interaction-evaluation system 102 also provides tools for reporting or blocking accounts of the social networking platform. Thus, in response to detecting a request to block the bot account associated with the private message 337, the user-interaction-evaluation system 102 can also provide a confirmation message 338 requesting the user to confirm the request to block the bot account.

Figure 3E:
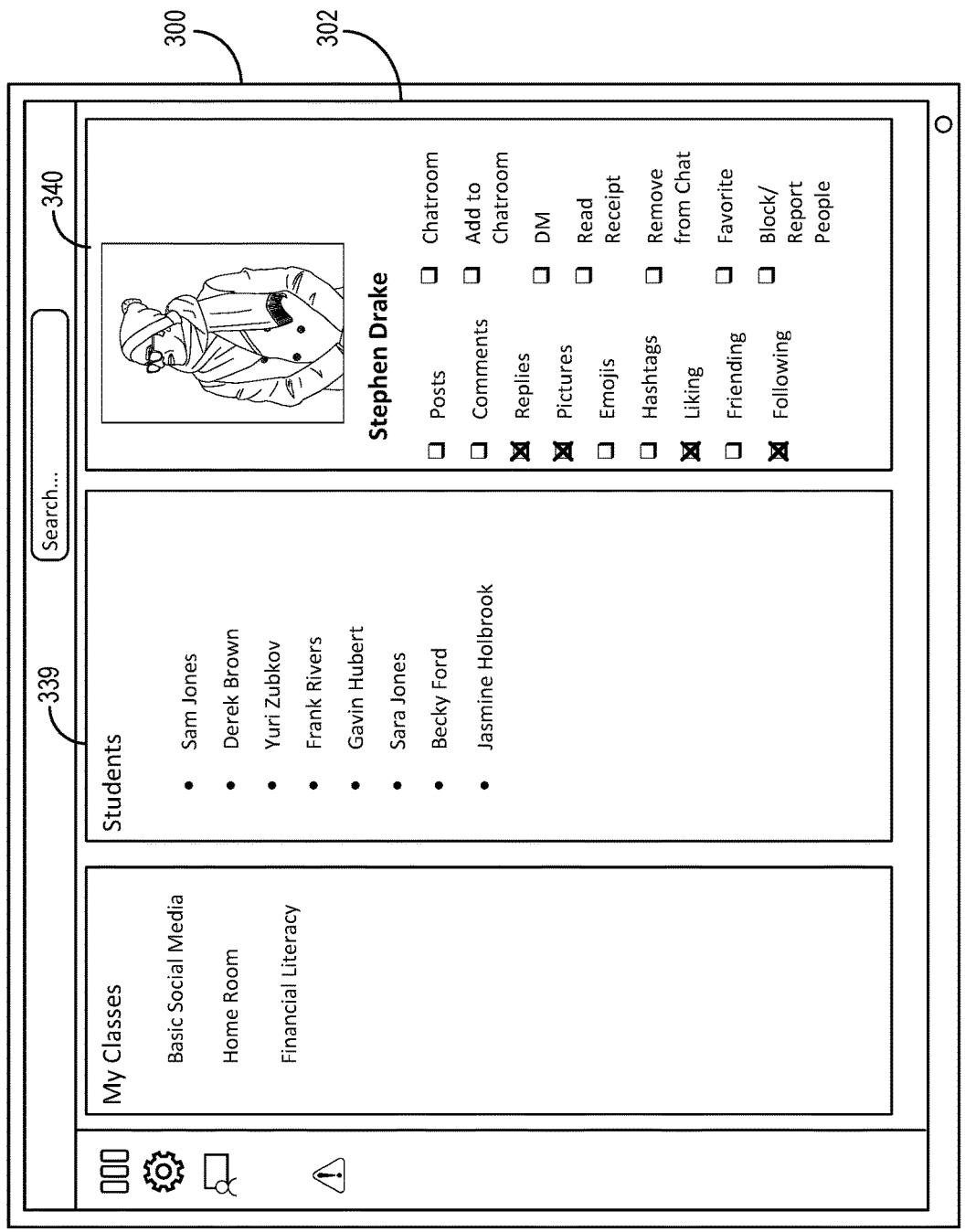

As mentioned, the administrator client device 300 can provide management of user interactions within a social networking platform. FIG. 3E illustrates that the administrator graphical user interface 302 on the administrator client device 300 provides a user listing 339 that displays a plurality of users associated with the social networking platform. In particular, the user listing 339 can include a set of users associated with a selected class or group (e.g., students in a particular class, employees of a business). In one or more embodiments, the administrator client device 300 can select a user from the user listing 339 to display additional information associated with the selected user.

FIG. 3E illustrates, for example, that selecting a user from the user listing 339 causes the administrator client device 300 to display an account actions interface 340. In particular, the account actions interface 340 can include user interaction controls for managing a plurality of actions available to a user account. In response to a selection of a user interaction control for an action in the account actions interface 340, the user-interaction-evaluation system 102 activates or deactivates a corresponding action that the user account can perform within the social networking platform. For instance, in response to detecting a selection to activate a "replies" action, the user-interaction-evaluation system 102 can activate functions or code for the user account to reply to digital content within the social networking platform. Similarly, disabling the "replies" action prevents the user account from replying to digital content.

In one or more embodiments, the user-interaction-evaluation system 102 automatically activates certain actions in the account actions interface 340 in connection with a user-interaction evaluation. For example, in response to initiating the user-interaction evaluation, the user-interaction-evaluation system 102 automatically activates a corresponding action for each user account for the plurality of users in the user list 339. In another example, the user-interaction-evaluation system 102 automatically deactivates one or more actions for each user account. In some embodiments, the user-interaction-evaluation system 102 activates or deactivates certain actions in response to manual indications to activate or deactivate the actions from the administrator client device 300. To illustrate, an administrator can utilize the account actions interface 340 to deactivate actions by user accounts that are abusing the actions within the social networking system.

Figure 3F:
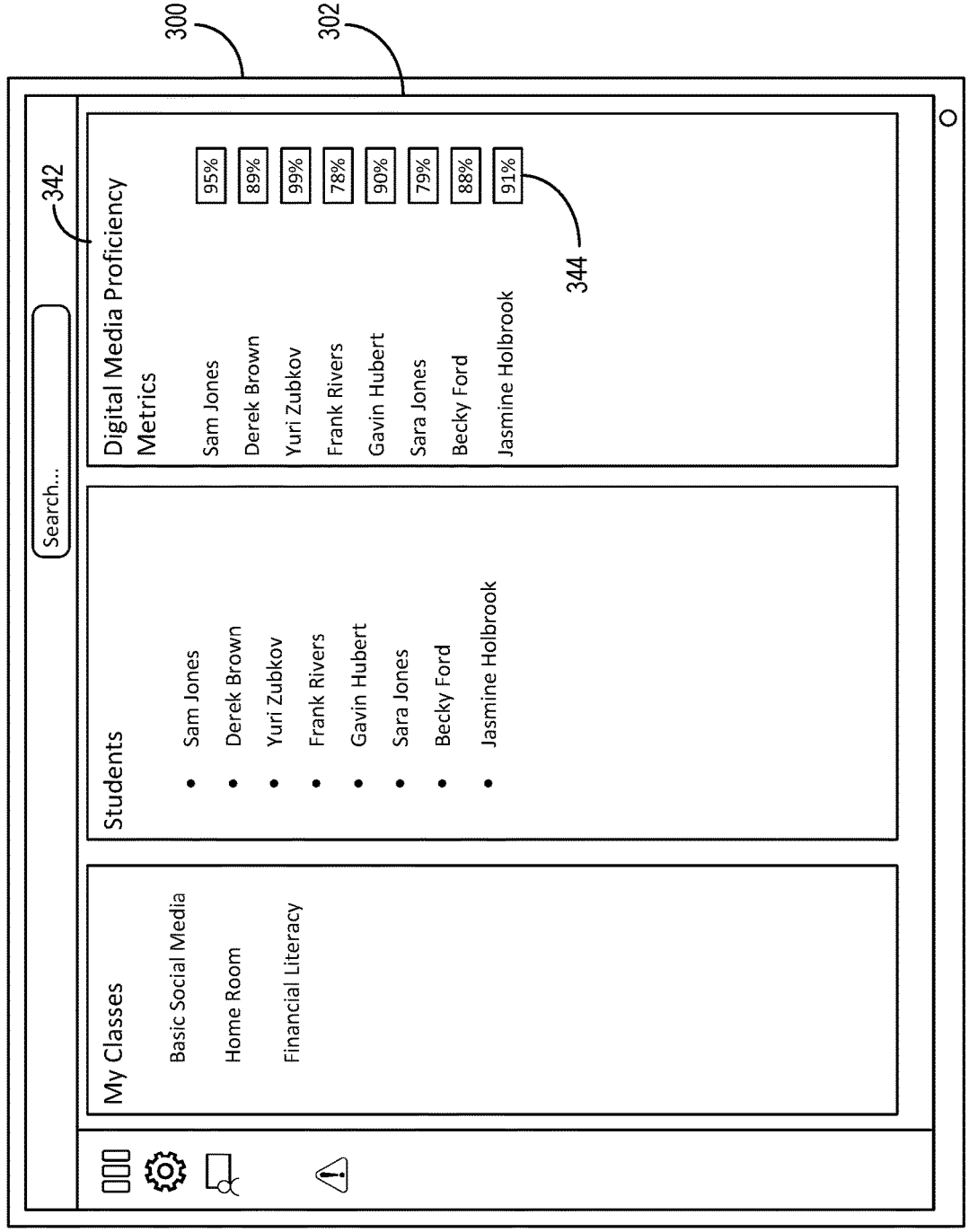

As discussed previously, the user-interaction-evaluation system 102 can utilize user interactions to generate digital-media-proficiency metrics for users of the user-interaction-evaluation system 102. FIG. 3F illustrates that the administrator client device 300 displays information associated with digital-media-proficiency metrics for the users within the administrator graphical user interface 302. Specifically, the user-interaction-evaluation system 102 can provide a metric interface 342 including a plurality of digital-media-proficiency metrics for users. To illustrate, the metric interface 342 includes a first digital-media-proficiency metric 344 for a user based on the user's interactions detected within the social networking platform. In one or more embodiments, the user-interaction-evaluation system 102 generates the digital-media-proficiency metrics to include a percentage-based grade. In alternative embodiments, the user-interaction-evaluation system 102 generates the digital-media-proficiency metrics to include a visual indicator that indicates the calculated digital-media-proficiency metric for a user relative to a maximum or minimum value. To illustrate, the user-interaction-evaluation system 102 can provide bar indicators that include lengths or colors indicative of the digital-media-proficiency metrics.

In one or more embodiments, the user-interaction-evaluation system 102 can also provide additional detail for specific digital-media-proficiency metrics. To illustrate, the administrator client device 300 can display specific details about the digital-media-proficiency metric for a particular user within a detailed metric interface. In particular, in response to a request to display details for the digital-media-proficiency metric 344 for a user, the user-interaction-evaluation system 102 provides the details to the administrator client device 300 to display within a detailed metric interface. For example, the user-interaction-evaluation system 102 can generate the digital-media-proficiency metrics based on a plurality of individual evaluation proficiency metrics corresponding to a digital media proficiency of the user with respect to each of a plurality of user-interaction evaluations.

As further illustrated by FIG. 3F, in one or more embodiments, the user-interaction-evaluation system 102 generates and provides the individual evaluation proficiency metrics and the digital-media-proficiency metric 344 for display as percentages out of a total possible value. In other embodiments, the user-interaction-evaluation system 102 provides the metrics for display as a color scale. Specifically, the user-interaction-evaluation system 102 can generate indicators with a color and size/length indicating the value of the metric out of a maximum possible value. To illustrate, a small/short bar with a red hue value can indicate a low evaluation proficiency metric or digital-media-proficiency metric, a mid-sized/medium bar with a yellow hue value can indicate a moderate proficiency metric or digital-media-proficiency metrics, and a large/long bar with a green hue value can indicate a high evaluation proficiency metric or digital-media-proficiency metric. Additionally, in some embodiments, the user-interaction-evaluation system 102 displays the digital-media-proficiency metric as a visual combination of the individual evaluation proficiency metrics (e.g., as a plurality of colored bars shaped into a single bar). In one or more embodiments, the grading scale can be shown as a chromatic scale, alphabetic scale, numeric scale, alphanumeric, or other scale, or other combination of values such as colors and numbers.

Figure 3G:
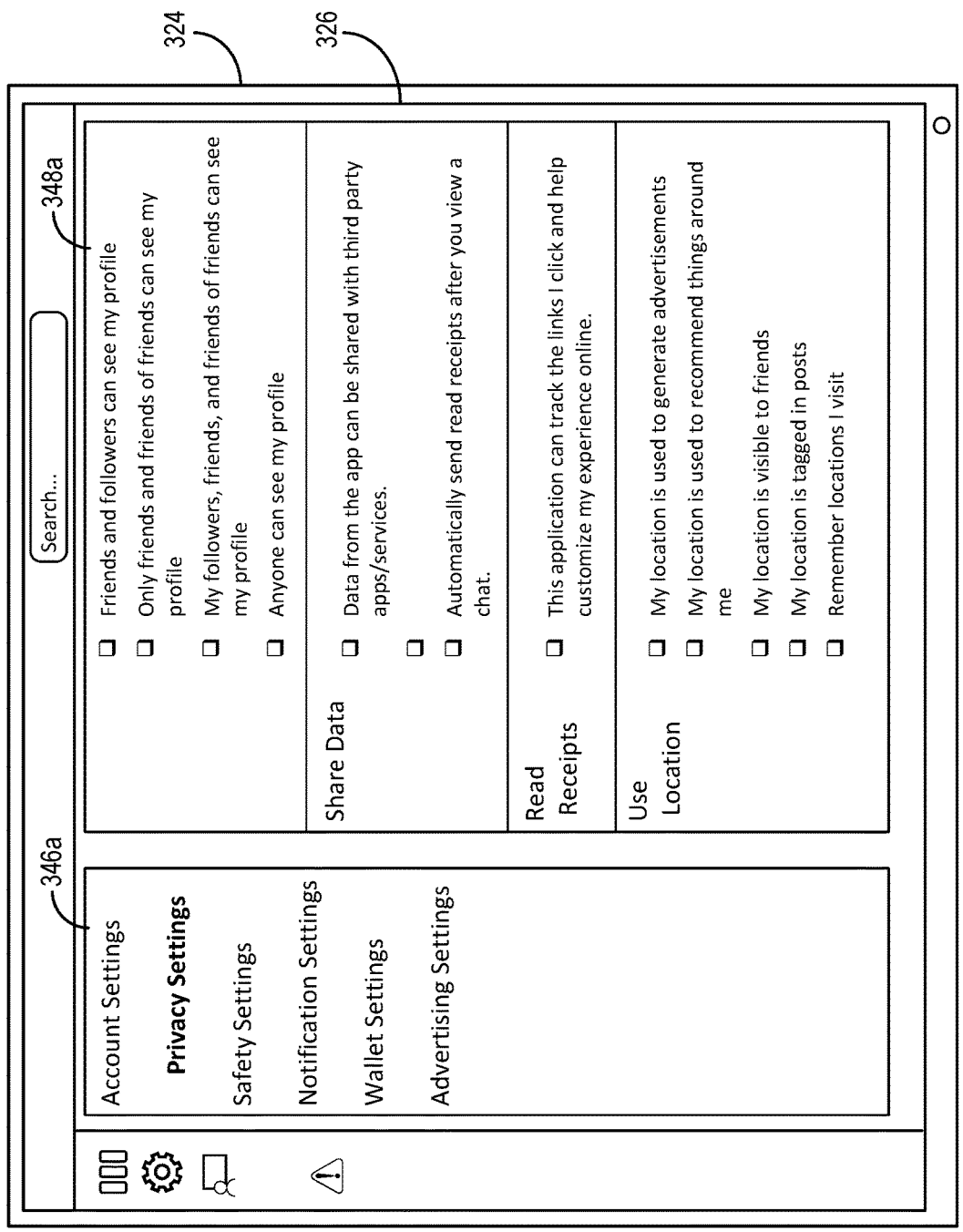
Figure 3H:
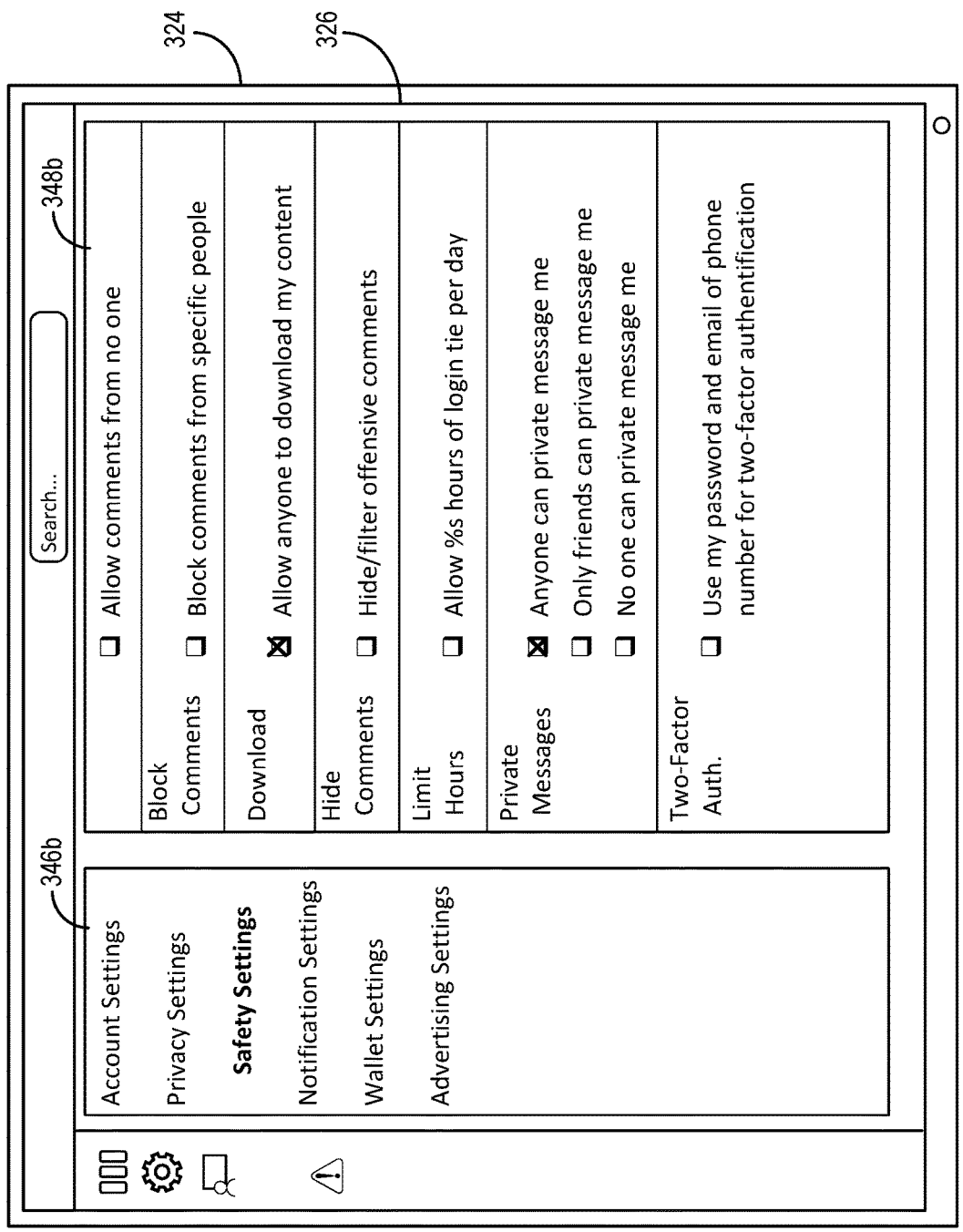
Figure 3I:
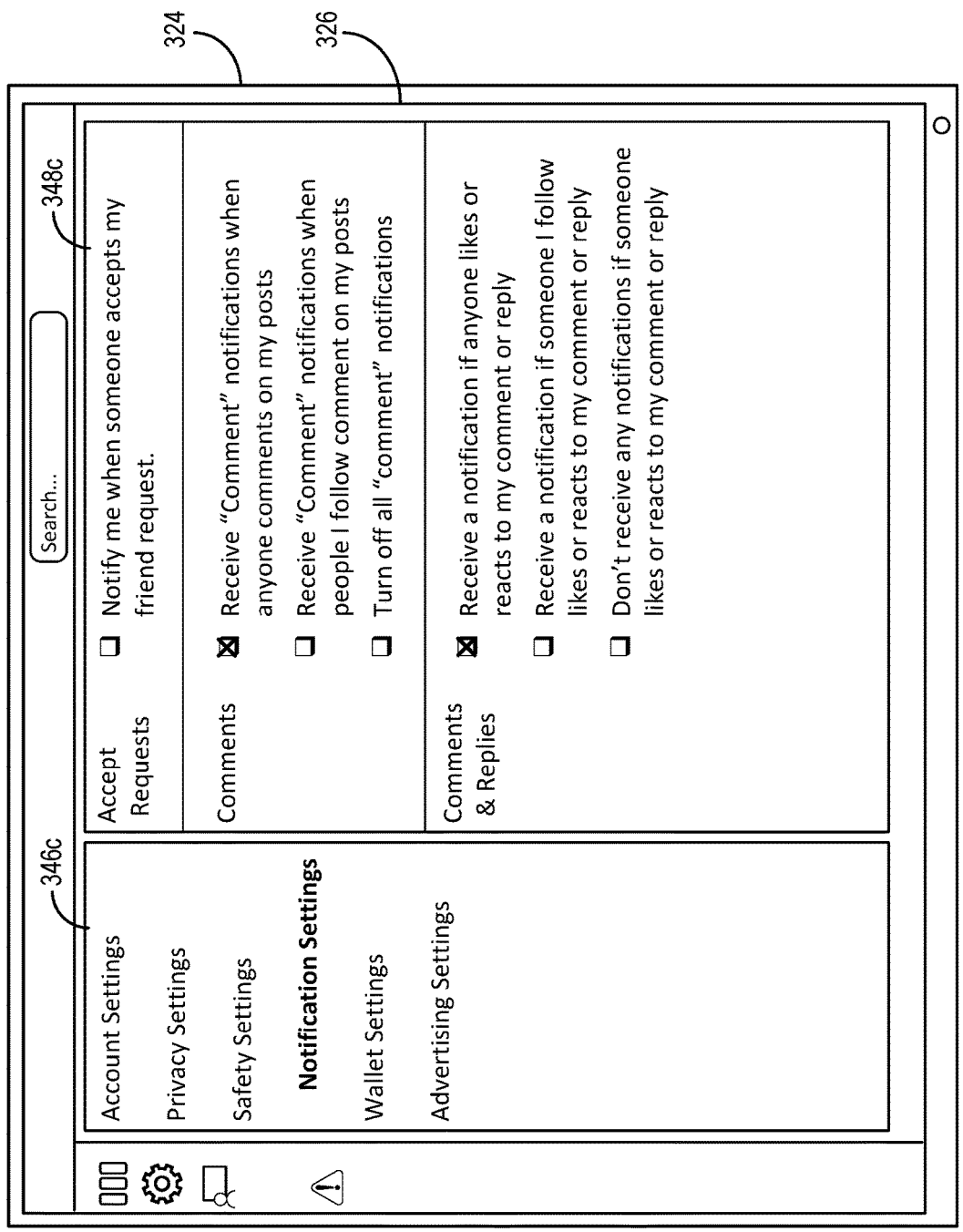

FIGS. 3G-3I illustrate examples of the user client device 324 illustrating various versions of or interfaces within the user graphical user interface 326. In particular, the user client device 324 can display a plurality of modifiable user account settings that modify privacy settings, security ("safety") settings, notification settings, or other settings associated with a user account. In various embodiments, the various settings can be in a single settings interface or across a plurality of interfaces.

For example, FIG. 3G illustrates a sidebar interface 346a by which the user client device 324 selects a privacy settings control. In response to a selection of the privacy settings control, the user client device 324 displays a privacy settings interface 348a in the user graphical user interface 326. The privacy settings interface 348a can include a plurality of settings that modify privacy behaviors of the social networking platform for the user account. According to one or more embodiments, the privacy settings interface 348a includes settings that determine whether user data (e.g., location data, read receipts, profile data) within the social networking platform is available to one or more other users or third-party systems.

FIG. 3H illustrates a sidebar interface 346b for selecting a security settings control. In response to a selection of the security settings control, for instance, the user client device 324 displays a security settings interface 348b in the user graphical user interface 326. The security settings interface 348b can include a plurality of settings that modify security behaviors of the social networking platform for the user account. For example, the security settings interface 348b includes settings that determine how other user accounts can interact with the user account. To illustrate, the security settings interface 348b can include whether another user account is blocked from interacting with the user account or hidden from view by the user account, whether the user account has activated two-factor authentication, etc.

FIG. 3I illustrates a sidebar interface 346c for selecting a notification settings control. In response to a selection of the notification settings control, the user client device 324 displays a notification settings interface 348c in the user graphical user interface 326. The notification settings interface 348c can include a plurality of settings that modify security behaviors of the social networking platform for the user account. For instance, the notification settings interface 348c includes settings that determine notification behaviors for the user account. In particular, the user-interaction-evaluation system 102 provides notifications to a user account of digital content or user interactions within the social networking platform based on the notification settings for the user account.

As mentioned, the user-interaction-evaluation system 102 can provide indications of user account settings to an administrator client device. For example, after a user establishes privacy, security, and/or notification settings (or modifies one or more settings), the user-interaction-evaluation system 102 can provide an indication to the administrator client device of the settings or modified setting(s). The administrator client device can then display the indication with other social networking data for user accounts (e.g., within the second portion 312 of the administrator graphical user interface 302 as in FIG. 3B).

Figure 4:
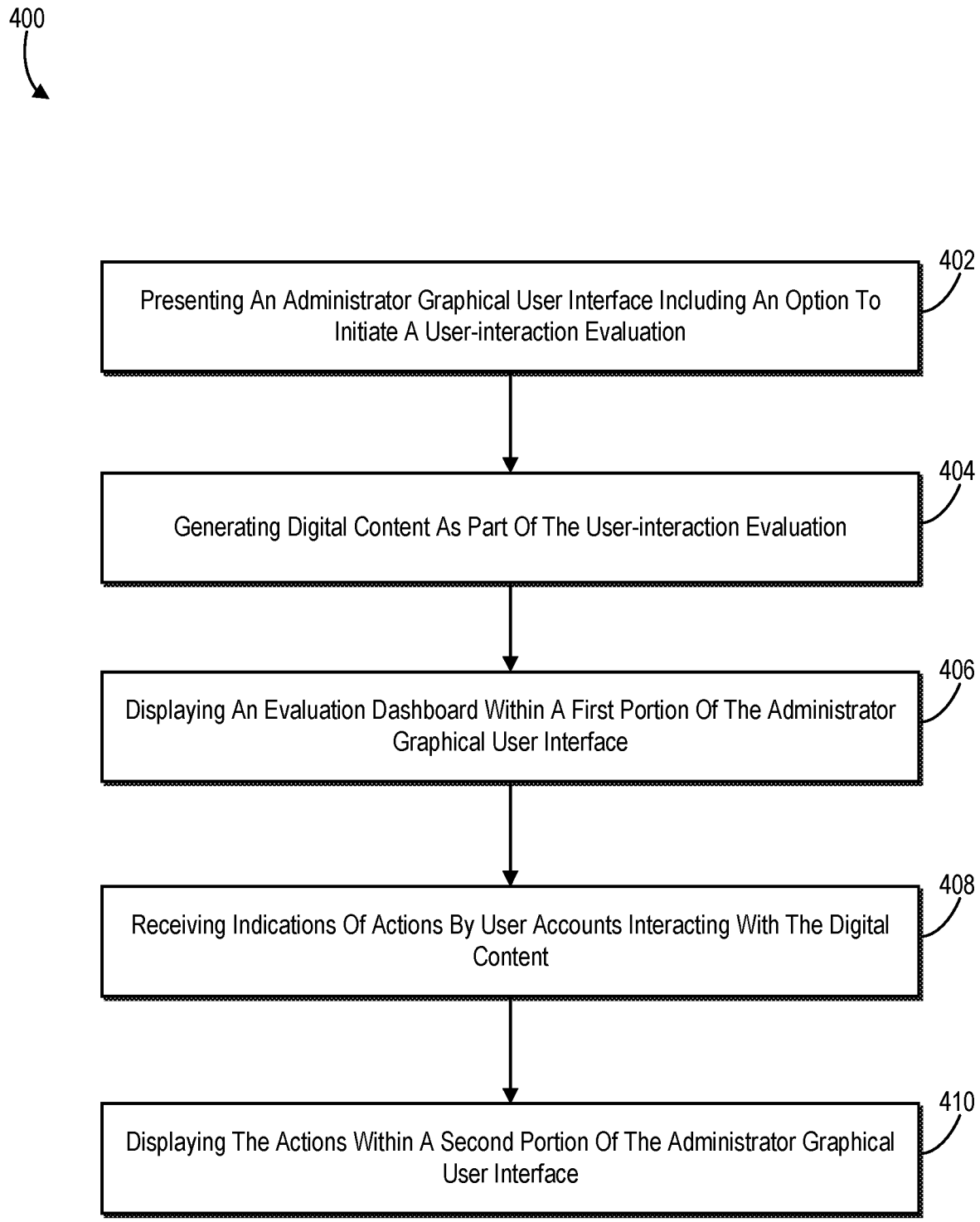
FIG. 4 illustrates a flowchart of a series of acts for generating digital content as part of a user-interaction evaluation and displaying user-interaction evaluation information and user interactions within a social networking system in accordance with one or more implementations.

Turning now to FIG. 4, this figure shows a flowchart of a series of acts 400 of generating digital content as part of a user-interaction evaluation and displaying user-interaction evaluation information and real-time user interactions within a social networking system. While FIG. 4 illustrates acts according to one embodiment, alternative embodiments may omit, add to, reorder, and/or modify any of the acts shown in FIG. 4. The acts of FIG. 4 can be performed as part of a method. Alternatively, a non-transitory computer readable medium can comprise instructions, that when executed by one or more processors, cause a computing device to perform the acts of FIG. 4. In still further embodiments, a system can perform the acts of FIG. 4.

As shown, the series of acts 400 includes an act 402 of presenting an administrator graphical user interface including an option to initiate a user-interaction evaluation. For example, act 402 involves presenting, for display on an administrator client device, an administrator graphical user interface comprising an option to initiate a user-interaction evaluation for digital media proficiency in a social networking platform comprising a plurality of users.

Additionally, the series of acts 400 includes an act 404 of generating digital content as part of the user-interaction evaluation. For example, act 404 involves, based on receiving a selection of the option to initiate the user-interaction evaluation, generating digital content for display within the social networking platform as part of the user-interaction evaluation.

Act 404 can involve receiving, from the administrator client device, a request to initiate a digital media bot as part of the user-interaction evaluation. Act 404 can also involve, based on receiving the request, generating the digital content by executing the digital media bot to perform one or more digital media actions associated with the user-interaction evaluation within the social networking platform. For example, act 404 can involve generating the digital content by executing the digital media bot to generate a social networking post within the social networking platform. Act 404 can then involve displaying, within the second portion of the administrator graphical user interface, the digital content generated by executing the digital media bot. Act 404 can also involve sending the digital content generated by executing the digital media bot to one or more user client devices associated with the one or more user accounts.

Act 404 can further involve sending the digital content generated by executing the digital media bot from a bot account to the one or more user accounts of the plurality of users within the social networking platform. For example, act 404 can involve sending a private message generated by executing the digital media bot from the bot account to a plurality of user accounts.

Act 404 can also involve generating first digital content by executing a first digital media bot as part of the user-interaction evaluation. Act 404 can then involve generating a bot interaction by executing a second digital media bot to perform an action relative to the digital content from the first digital media bot as part of the user-interaction evaluation.

Act 404 can also involve activating, in connection with initiating the user-interaction evaluation, a user interaction control that enables a particular interaction by a user account of the one or more user accounts with the digital content. For example, act 404 can involve initiating a user interaction control to enable one or more actions by the user account associated with a topic of the user-interaction evaluation.

The series of acts 400 also includes an act 406 of displaying an evaluation dashboard within a first portion of the administrator graphical user interface. For example, act 406 involves displaying, within a first portion of the administrator graphical user interface, an evaluation dashboard comprising information associated with the user-interaction evaluation. Act 406 can involve displaying, within the first portion, an element to execute a digital media bot as part of the user-interaction evaluation.

The series of acts 400 further includes an act 408 of receiving indications of actions by user accounts interacting with the digital content. For example, act 408 involves receiving indications of a plurality of actions interacting with the digital content from one or more user accounts of the plurality of users within the social networking platform.

Act 408 can involve receiving indications of the plurality of actions interacting with the digital content from the one or more user accounts by receiving an indication that a first user account reacted to the digital content by selecting a graphic icon to associate with the digital content, shared the digital content with a second user account, responded to the digital content within the social networking platform, or subscribed to receive content from a bot account for the digital media bot. For example, act 408 can involve detecting interactions by the one or more user accounts to react to the digital content.

In one or more embodiments, the series of acts 400 includes displaying, within a graphical user interface of a client device associated with a user account of the one or more user accounts, the digital content generated by executing the digital media bot within a social networking feed of the social networking platform from a bot account associated with the digital media bot to the user account. Additionally, the series of acts 400 can include detecting an interaction by the user account with the digital content within the social networking feed. The series of acts 400 can include displaying, within the second portion of the administrator graphical user interface, the digital content generated by executing the digital media bot with the detected interactions by the one or more user accounts.

The series of acts 400 also includes an act 410 of displaying the actions within a second portion of the administrator graphical user interface. For example, act 410 involves displaying, within a second portion of the administrator graphical user interface, the plurality of actions from the one or more user accounts of the plurality of users.

Act 410 can also involve displaying, within the second portion of the administrator graphical user interface, the digital content generated by executing the digital media bot with user-generated digital content associated with the one or more user accounts. Additionally, act 410 can involve displaying, within the second portion of the administrator graphical user interface and with the digital content, the indication that the first user account reacted to the digital content, shared the digital content with the second user account, responded to the digital content within the social networking platform, or subscribed to receive content from a bot account for the digital media bot.

The series of acts 400 can include providing, for display within the administrator graphical user interface, a plurality of user-account controls for a user account of the one or more user accounts. The series of acts 400 can also include receiving, from the administrator client device, a selection to disable a user-account control of the plurality of user-account controls. The series of acts 400 can further include, in response to the selection, restricting access by the user account to an action to interact with the digital content.

The series of acts 400 can include providing, within the administrator graphical user interface, a plurality of available user-interaction evaluations for digital media proficiency in the social networking platform. The series of acts 400 can also include receiving, from the administrator client device, a request to initiate the user-interaction evaluation together with an additional user-interaction evaluation of the plurality of available user-interaction evaluations. Additionally, the series of acts 400 can include displaying, within the first portion of the administrator graphical user interface, the evaluation dashboard comprising the information associated with the user-interaction evaluation and additional information associated with the additional user-interaction evaluation.

In one or more embodiments, the series of acts 400 includes receiving, from a user client device associated with a user account of the one or more user accounts, a request to delete digital content generated by the user account from the social networking platform. The series of acts 400 can also include removing the digital content generated by the user account from access by the one or more user accounts. Additionally, the series of acts 400 can include displaying an indication of the request to delete the digital content generated by the user account with the digital content generated by the user account within the second portion of the administrator graphical user interface. Thus, the series of acts 400 can include removing the digital content generated by the user account from access by the one or more user accounts while maintaining access to the digital content generated by the user account by the administrator client device.

The series of acts 400 can include displaying, within a graphical user interface of a client device associated with a user account of the one or more user accounts, user account settings that correspond to a content behavior of the user account and security controls for the user account. The series of acts 400 can also include receiving, from a client device associated with a user account of the one or more user accounts, selected user account settings that indicate a content behavior of the user account and security controls for the user account, wherein at least a first selected user account setting modifies a function of the social networking platform. The series of acts 400 can then include displaying, within the administrator graphical user interface, the selected user account settings for the user account. Additionally, the series of acts 400 can include modifying the digital content generated by executing the digital media bot provided to the user account based on the first selected user account setting.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
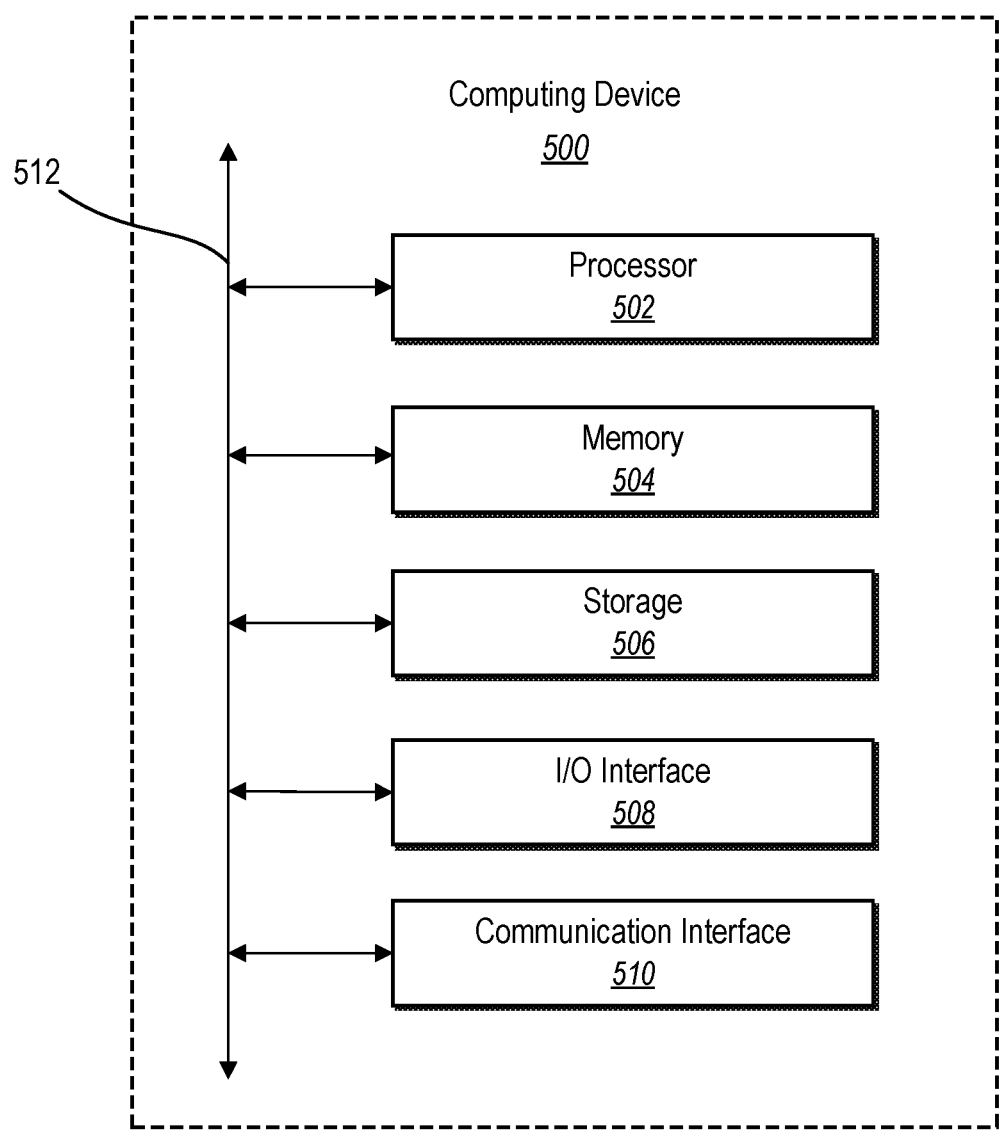
FIG. 5 illustrates a block diagram of an exemplary computing device in accordance with one or more embodiments.

FIG. 5 illustrates a block diagram of exemplary computing device 500 that may be configured to perform one or more of the processes described above. One will appreciate that one or more computing devices such as the computing device 500 may implement the system(s) of FIG. 1. As shown by FIG. 5, the computing device 500 can comprise a processor 502, a memory 504, a storage device 506, an I/O interface 508, and a communication interface 510, which may be communicatively coupled by way of a communication infrastructure 512. In certain embodiments, the computing device 500 can include fewer or more components than those shown in FIG. 5. Components of the computing device 500 shown in FIG. 5 will now be described in additional detail.

In one or more embodiments, the processor 502 includes hardware for executing instructions, such as those making up a computer program. As an example, and not by way of limitation, to execute instructions for dynamically modifying workflows, the processor 502 may retrieve (or fetch) the instructions from an internal register, an internal cache, the memory 504, or the storage device 506 and decode and execute them. The memory 504 may be a volatile or non-volatile memory used for storing data, metadata, and programs for execution by the processor(s). The storage device 506 includes storage, such as a hard disk, flash disk drive, or other digital storage device, for storing data or instructions for performing the methods described herein.

The I/O interface 508 allows a user to provide input to, receive output from, and otherwise transfer data to and receive data from computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces and/or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example, and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 510 may facilitate communications with various types of wired or wireless networks. The communication interface 510 may also facilitate communications using various communication protocols. The communication infrastructure 512 may also include hardware, software, or both that couples components of the computing device 500 to each other. For example, the communication interface 510 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   present, for display on an administrator client device, an administrator graphical user interface comprising an option to initiate a user-interaction evaluation for digital media proficiency in a social networking platform comprising a plurality of users;
   based on receiving a selection of the option to initiate the user-interaction evaluation, generate digital content for display within the social networking platform as part of the user-interaction evaluation;
   display, within a first portion of the administrator graphical user interface, an evaluation dashboard comprising information associated with the user-interaction evaluation;
   display, within the administrator graphical user interface, selected user account settings received from a client device associated with a user account of the plurality of users, the selected user account settings comprising a first selected user account setting modifying a content behavior of the user account or a security control for the user account within the social networking platform;
   modify the digital content generated as part of the user-interaction evaluation based on the first selected user account setting;
   receive indications of a plurality of actions interacting with the digital content from one or more user accounts of the plurality of users within the social networking platform; and
   display, within a second portion of the administrator graphical user interface, the plurality of actions from the one or more user accounts of the plurality of users.

2. The non-transitory computer readable storage medium as recited in claim 1, further comprising instructions that, when executed by the at least one processor, cause the computing device to generate the digital content for display within the social networking platform by:
   receiving, from the administrator client device, a request to initiate a digital media bot as part of the user-interaction evaluation;
   based on receiving the request, generating the digital content by executing the digital media bot to perform one or more digital media actions associated with the user-interaction evaluation within the social networking platform; and
   displaying, within the second portion of the administrator graphical user interface, the digital content generated by executing the digital media bot.

3. The non-transitory computer readable storage medium as recited in claim 2, further comprising instructions that, when executed by the at least one processor, cause the computing device to:
   send the digital content generated by executing the digital media bot from a bot account to the one or more user accounts of the plurality of users within the social networking platform; and
   display, within the second portion of the administrator graphical user interface, the digital content generated by executing the digital media bot with user-generated digital content associated with the one or more user accounts.

4. The non-transitory computer readable storage medium as recited in claim 2, further comprising instructions that, when executed by the at least one processor, cause the computing device to:
   receive indications of the plurality of actions interacting with the digital content from the one or more user accounts by receiving an indication that a first user account reacted to the digital content by selecting a graphic icon to associate with the digital content, shared the digital content with a second user account, responded to the digital content within the social networking platform, or subscribed to receive content from a bot account for the digital media bot; and
   display, within the second portion of the administrator graphical user interface and with the digital content, the indication that the first user account reacted to the digital content, shared the digital content with the second user account, responded to the digital content within the social networking platform, or subscribed to receive content from a bot account for the digital media bot.

5. The non-transitory computer readable storage medium as recited in claim 2, further comprising instructions that, when executed by the at least one processor, cause the computing device to:
   display, within a graphical user interface of a client device associated with a user account of the one or more user accounts, the digital content generated by executing the digital media bot within a social networking feed of the social networking platform from a bot account associated with the digital media bot to the user account; and
   detect an interaction by the user account with the digital content within the social networking feed.

6. The non-transitory computer readable storage medium as recited in claim 1, further comprising instructions that, when executed by the at least one processor, cause the computing device to:
   provide, within the administrator graphical user interface, a plurality of available user-interaction evaluations for digital media proficiency in the social networking platform;
   receive, from the administrator client device, a request to initiate the user-interaction evaluation together with an additional user-interaction evaluation of the plurality of available user-interaction evaluations; and
   display, within the first portion of the administrator graphical user interface, the evaluation dashboard comprising the information associated with the user-interaction evaluation and additional information associated with the additional user-interaction evaluation.

7. The non-transitory computer readable storage medium as recited in claim 1, further comprising instructions that, when executed by the at least one processor, cause the computing device to:
   receive, from a user client device associated with a user account of the one or more user accounts, a request to delete digital content generated by the user account from the social networking platform;
   remove the digital content generated by the user account from access by the one or more user accounts; and
   display an indication of the request to delete the digital content generated by the user account with the digital content generated by the user account within the second portion of the administrator graphical user interface.

8. The non-transitory computer readable storage medium as recited in claim 1, further comprising instructions that, when executed by the at least one processor, cause the computing device to:
provide, for display within the administrator graphical user interface, a plurality of user-account controls for a user account of the one or more user accounts;
receive, from the administrator client device, a selection to disable a user-account control of the plurality of user-account controls; and
in response to the selection, restrict access by the user account to an action to interact with the digital content.

9. A system comprising:
at least one processor; and
a non-transitory computer readable storage medium comprising instructions that, when executed by the at least one processor, cause the system to:
present, for display on an administrator client device, an administrator graphical user interface comprising an option to initiate a user-interaction evaluation for digital media proficiency in a social networking platform comprising a plurality of users;
based on receiving a selection of the option to initiate the user-interaction evaluation, generate digital content for display within the social networking platform as part of the user-interaction evaluation;
display, within a first portion of the administrator graphical user interface, an evaluation dashboard comprising information associated with the user-interaction evaluation;
display, within the administrator graphical user interface, selected user account settings received from a client device associated with a user account of the plurality of users, the selected user account settings comprising a first selected user account setting modifying a content behavior of the user account or a security control for the user account within the social networking platform;
modify the digital content generated as part of the user-interaction evaluation based on the first selected user account setting;
receive indications of a plurality of actions interacting with the digital content from one or more user accounts of the plurality of users within the social networking platform; and
display, within a second portion of the administrator graphical user interface, the plurality of actions from the one or more user accounts of the plurality of users.

10. The system as recited in claim 9, further comprising instructions that, when executed by the at least one processor, cause the system to generate the digital content for display within the social networking platform by:
generating the digital content by executing a digital media bot to perform one or more digital media actions associated with the user-interaction evaluation within the social networking platform;
displaying, within the second portion of the administrator graphical user interface, the digital content generated by executing the digital media bot; and
sending the digital content generated by executing the digital media bot to one or more user client devices associated with the one or more user accounts.

11. The system as recited in claim 10, further comprising instructions that, when executed by the at least one processor, cause the system to receive the indications of the plurality of actions interacting with the digital content from one or more user accounts by:
detecting interactions by the one or more user accounts to react to the digital content by selecting a graphic icon to associate with the digital content, share the digital content with other user accounts, respond to the digital content within the social networking platform, or subscribe to receive content from a bot account for the digital media bot; and
displaying, within the second portion of the administrator graphical user interface, the digital content generated by executing the digital media bot with the detected interactions by the one or more user accounts.

12. The system as recited in claim 10, further comprising instructions that, when executed by the at least one processor, cause the system to:
provide, to the client device associated with the user account of the one or more user accounts, user account settings comprising security controls that modify security behaviors of the social networking platform for the user account;
receive, from the client device associated with the user account of the one or more user accounts, the first selected user account setting indicating whether one or more additional user accounts can interact with the user account within the social networking platform;
display, within the administrator graphical user interface, the first selected user account setting for the user account; and
modify the digital content generated by executing the digital media bot provided to the user account based on the first selected user account setting.

13. The system as recited in claim 9, further comprising instructions that, when executed by the at least one processor, cause the system to:
provide, within the administrator graphical user interface, a plurality of available user-interaction evaluations for digital media proficiency in the social networking platform;
receive, from the administrator client device, a request to initiate the user-interaction evaluation together with an additional user-interaction evaluation of the plurality of available user-interaction evaluations; and
initiate the user-interaction evaluation and the additional user-interaction evaluation by:
displaying, within the first portion of the administrator graphical user interface, the information associated with the user-interaction evaluation and additional information associated with the additional user-interaction evaluation; and
generating the digital content by executing a first digital media bot associated with the user-interaction evaluation and a second digital media bot associated with the additional user-interaction evaluation.

14. The system as recited in claim 9, further comprising instructions that, when executed by the at least one processor, cause the system to:
receive, from a user client device associated with a user account of the one or more user accounts, a request to delete digital content generated by the user account from the social networking platform; and
remove the digital content generated by the user account from access by the one or more user accounts while maintaining access to the digital content generated by the user account by the administrator client device.

15. The system as recited in claim 9, further comprising instructions that, when executed by the at least one processor, cause the system to activate, in connection with initiating the user-interaction evaluation, a user interaction control that enables a particular interaction by a user account of the one or more user accounts with the digital content.

16. The system as recited in claim 9, further comprising instructions that, when executed by the at least one processor, cause the system to generate the digital content for display within the social networking platform by:
    generating first digital content by executing a first digital media bot as part of the user-interaction evaluation; and
    generating a bot interaction by executing a second digital media bot to perform an action relative to the digital content from the first digital media bot as part of the user-interaction evaluation.

17. A method comprising:
    presenting, for display on an administrator client device, an administrator graphical user interface comprising an option to initiate a user-interaction evaluation for digital media proficiency in a social networking platform comprising a plurality of users;
    based on receiving a selection of the option to initiate the user-interaction evaluation, generating, by at least one processor, digital content for display within the social networking platform as part of the user-interaction evaluation;
    displaying, within a first portion of the administrator graphical user interface, an evaluation dashboard comprising information associated with the user-interaction evaluation;
    displaying, within the administrator graphical user interface, selected user account settings received from a client device associated with a user account of the plurality of users, the selected user account settings comprising a first selected user account setting modifying a content behavior of the user account or a security control for the user account within the social networking platform;
    modifying, by the at least one processor, the digital content generated as part of the user-interaction evaluation based on the first selected user account setting;
    receiving, by the at least one processor, indications of a plurality of actions interacting with the digital content from one or more user accounts of the plurality of users within the social networking platform; and
    displaying, within a second portion of the administrator graphical user interface, the plurality of actions from the one or more user accounts of the plurality of users.

18. The method as recited in claim 17, wherein generating the digital content for display within the social networking platform comprises:
    receiving, from the administrator client device, a request to initiate a digital media bot as part of the user-interaction evaluation;
    generating the digital content by executing the digital media bot to generate a social networking post within the social networking platform;
    displaying, within the second portion of the administrator graphical user interface, the social networking post generated by executing the digital media bot; and
    sending the social networking post generated by executing the digital media bot to one or more user client devices associated with the one or more user accounts.

19. The method as recited in claim 18, wherein receiving the indications of the plurality of actions interacting with the digital content from one or more user accounts comprises:
    detecting an interaction by a user account of the one or more user accounts with the social networking post; and
    displaying, within the second portion of the administrator graphical user interface, the social networking post generated by executing the digital media bot with the detected interaction by the user account with the social networking post.

20. The method as recited in claim 17, further comprising:
    receiving, from the administrator client device, the selection of the option to initiate the user-interaction evaluation together with an additional user-interaction evaluation;
    initiating the user-interaction evaluation and the additional user-interaction evaluation by generating the digital content as part of the user-interaction evaluation and additional digital content as part of the additional user-interaction evaluation; and
    displaying interactions with the digital content and the additional digital content within the second portion of the administrator graphical user interface.

* * * * *